US012807835B2

(12) United States Patent
Feng et al.

(10) Patent No.: US 12,807,835 B2

(45) **Date of Patent: *Nov. 24, 2026**

(54) POLYESTER COMPOSITIONS FOR METAL PACKAGING COATINGS

(71) Applicant: Eastman Chemical Company, Kingsport, TN (US)

(72) Inventors: Linqian Feng, Johnson City, TN (US); Cameron Lee Brown, Kingsport, TN (US); John Thorton Maddox, Jonesborough, TN (US); Alain Michel Cagnard, Kingsport, TN (US); Selene Ayde De Leon Ibarra, Kingsport, TN (US); Thauming Kuo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 668 days.

This patent is subject to a terminal disclaimer.

(21) Appl. No.: 18/247,894

(22) PCT Filed: Oct. 21, 2021

(86) PCT No.: PCT/US2021/055975

§ 371 (c)(1),
(2) Date: Apr. 5, 2023

(87) PCT Pub. No.: WO2022/093613

PCT Pub. Date: May 5, 2022

(65) Prior Publication Data

US 2024/0034905 A1 Feb. 1, 2024

Related U.S. Application Data

(60) Provisional application No. 63/106,060, filed on Oct. 27, 2020.

(51) Int. Cl.

| | |
|---|---|
| ***C09D 175/06*** | (2006.01) |
| ***C08G 18/40*** | (2006.01) |
| ***C08G 18/42*** | (2006.01) |
| ***C08G 18/54*** | (2006.01) |
| ***C08G 18/75*** | (2006.01) |
| ***C08G 63/183*** | (2006.01) |
| ***C08G 63/199*** | (2006.01) |
| ***C09D 7/20*** | (2018.01) |
| ***C09D 167/02*** | (2006.01) |
| ***C09D 175/12*** | (2006.01) |

(52) U.S. Cl.

CPC ....... *C09D 175/06* (2013.01); *C08G 18/4027* (2013.01); *C08G 18/423* (2013.01); *C08G 18/542* (2013.01); *C08G 18/544* (2013.01); *C08G 18/755* (2013.01); *C08G 63/183* (2013.01); *C08G 63/199* (2013.01); *C09D 7/20* (2018.01); *C09D 167/02* (2013.01); *C09D 175/12* (2013.01)

(58) Field of Classification Search

CPC ...... C09D 175/06; C09D 7/20; C09D 175/12; C09D 167/02; C08G 18/4027; C08G 18/423; C08G 18/542; C08G 18/544; C08G 18/755; C08G 63/199; C08G 63/183

See application file for complete search history.

(56) References Cited

U.S. PATENT DOCUMENTS

| | | | | |
|---|---|---|---|---|
| 6,218,482 | B1 | 4/2001 | Yamanaka et al. | |
| 2013/0280455 | A1 | 10/2013 | Evans et al. | |
| 2015/0125643 | A1 | 5/2015 | Takagi et al. | |
| 2017/0216152 | A1 * | 8/2017 | Hecht | A61K 6/61 |
| 2018/0223126 | A1 | 8/2018 | Beccaria et al. | |
| 2018/0291232 | A1 | 10/2018 | Kashiwakura et al. | |
| 2019/0315903 | A1 | 10/2019 | Powell et al. | |
| 2019/0359846 | A1 * | 11/2019 | Fix | C09D 167/00 |

FOREIGN PATENT DOCUMENTS

| | | | |
|---|---|---|---|
| EP | 3 431 547 | A1 | 10/2015 |
| WO | WO 2016 069567 | A2 | 5/2016 |

OTHER PUBLICATIONS

Odian, George, Principles of Polymerization, Third Ed., John Wiley & Sons, Inc., 1991, pp. 19-24.*

Feng et al., "From Fundamentals to Applications: Understanding BPA-Non-Intent Resin Technology in Food Contact Metal Packaging Coatings", Coatings Tech, Jun. 2019, pp. 28-37.*

Notification of Transmittal of the International Search Report and the Written Opinion of the International Searching Authority, or the Declaration; PCT/US2021/55975 with a date of mailing Feb. 1, 2022.

Argyropoulos, John et al.; "Seed oil based polyester polyols for coatings"; J. Coat. Technology. Res., 6 (4), (2009), pp. 501-508.

API, "ASTM Paint Committee Approves New Solvent Rub Standard", Aug. 18, 2013, pp. 1-2.

European Search Report dated Feb. 9, 2024 for Application No. 21887215.8.

* cited by examiner

*Primary Examiner* — Patrick D Niland

(74) *Attorney, Agent, or Firm* — Polly C. Owen; Judith C. Rawis

(57) ABSTRACT

This invention pertains to improved polyester polyol compositions containing 2,2,4,4-tetramethyl-1,3-cyclobutanediol (TMCD). Coating compositions based on such TMCD polyester polyols are capable of providing a good balance of desirable coating properties such as solvent resistance, acid resistance, retort resistance, microcracking resistance, and bending ability. The TMCD coating compositions have particular utility for use in metal packaging applications.

19 Claims, 1 Drawing Sheet

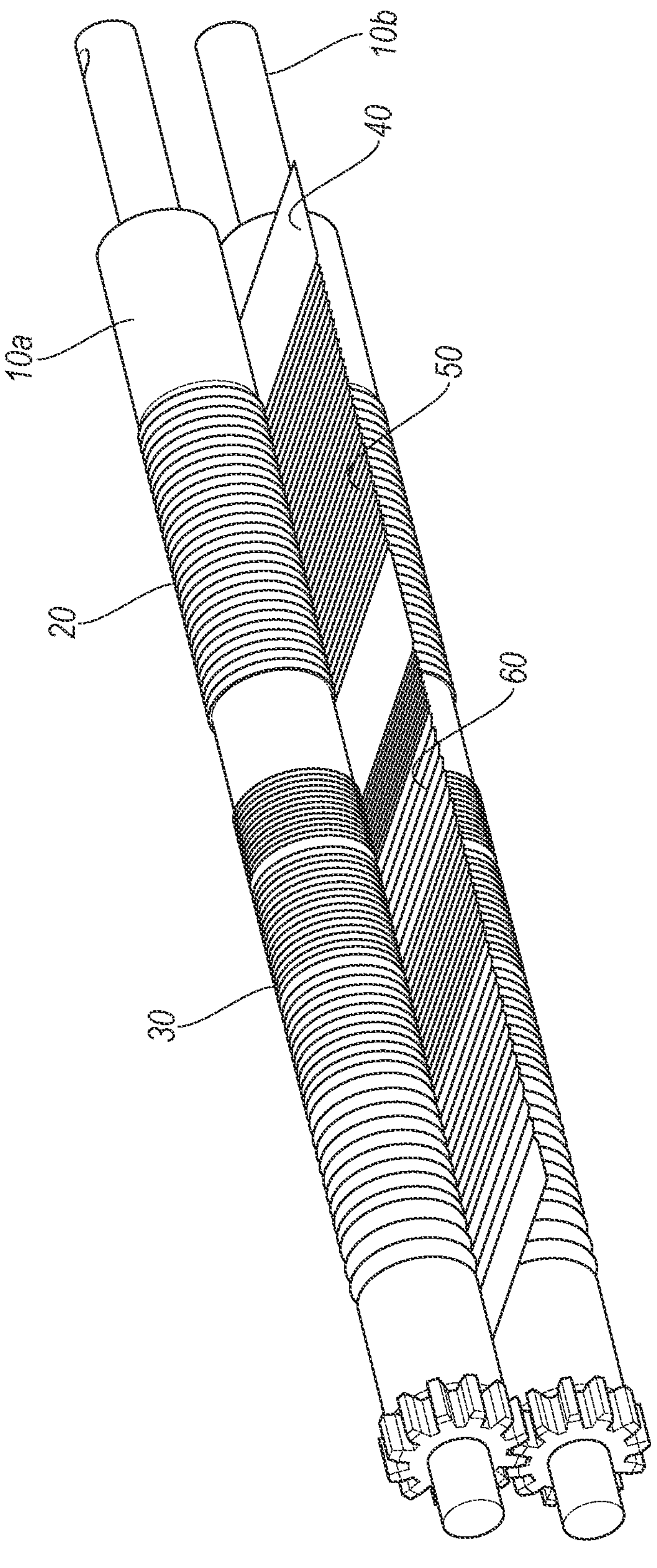
10b
40
10a
50
20
60
30

POLYESTER COMPOSITIONS FOR METAL PACKAGING COATINGS

CROSS-REFERENCE TO RELATED APPLICATION(S)

This application is a national stage filing under 35 USC § 371 of International Application Number PCT/US2021/055975, filed on, Oct. 21, 2021 which claims the benefit of the filing date to U.S. Provisional Application No. 63/106,060, filed on Oct. 27, 2020, the entire disclosures of which are incorporated by reference herein.

FIELD OF THE INVENTION

This application relates to chemistry in general. In particular, this application relates to polyester compositions. More particularly this application relates to polyester compositions containing 2,2,4,4-tetramethyl-1,3-cyclobutanediol (TMCD) for use in coating metals.

BACKGROUND OF THE INVENTION

Metal containers are commonly used for food and beverage packaging. The containers are typically made of steel or aluminum. A prolonged contact between the metal and the filled product can lead to corrosion of the container. To prevent direct contact between filled product and metal, a coating is typically applied to the interior of the food and beverage cans. In order to be effective, such a coating must have adequate properties that are needed for protecting the packaged products, such as adhesion, corrosion resistance, chemical resistance, flexibility, stain resistance, and hydrolytic stability. Moreover, the coating must be able to withstand processing conditions during can fabrication and food sterilization. Coatings based on a combination of epoxy and phenolic resins are known to be able to provide a good balance of the required properties and are most widely used. Some industry sectors are moving away from food contact polymers made with bisphenol A (BPA), a basic building block of epoxy resins. Thus, there exists a need for non-BPA containing coatings for use in interior can coatings.

Polyester resins are of particular interest to the coating industry as a replacement for epoxy resin because of their comparable properties such as flexibility and adhesion. 2,2,4,4-Tetramethyl-1,3-cyclobutanediol (TMCD) is a cycloaliphatic compound that can be used as a diol component for making polyesters. Thermoplastics based on TMCD polyester exhibit improved impact resistance owing to TMCD's unique structure. TMCD can also provide improved hydrolytic stability of the polyester due to its secondary hydroxyl functionality. Both of these properties are highly desirable in thermosetting coatings.

Coatings based on TMCD polyesters have been of interest to replace epoxy resins for interior can coating application. Prior efforts have been directed to coating systems based on high Tg, mid-molecular weight TMCD polyesters with slight crosslinking in order to withstand processing conditions during can fabrication. Such systems, however, have been found to have shortcomings in some of the desired properties such as corrosion resistance, retort resistance, and microcracking (crazing) resistance. Higher crosslinking can lead to improved coating properties such as corrosion resistance, acid resistance, stain resistance, and retort resistance. Such coatings, however, tend to be less flexible, which can have detrimental effects on microcracking resistance and bending ability during processing. US Patent Application No. 2018/0223126A1 disclosed coating compositions for metal packaging based on TMCD polyester polyols curable with isocyanate crosslinkers. The claimed polyester polyol compositions were limited to aromatic acids, such as isophthalic acid (IPA) and terephthalic acid (TPA), without aliphatic acids. Further, in the US Patent Application No. 2018/0223126A1 examples, a majority of the polyesters had either 30/70 or 35/65 mole ratio of TPA/IPA with TPA being the smaller component. The highest TPA ratio used was 40 mole % when part of IPA was replaced with 1,4-cyclohexanedicarboxylic acid. Coating compositions based on such TMCD polyesters were found to have improved sterilization resistance, but in general having deficiency in wedge bend resistance. Thus, there remains a need to discover a suitable TMCD containing polyester polyol composition that can provide a good balance of the desirable coating properties for metal packaging applications.

SUMMARY OF THE INVENTION

In one embodiment this invention provides a coating composition for metal packaging, comprising:

a. a polyester polyol, which is the reaction product of the monomers comprising:
   i. 2,2,4,4-tetramethyl-1,3-cyclobutanediol in an amount of 28 to mole %, based on the total moles of i-iv,
   ii. 2-methyl-1,3-propanediol in an amount of 5 to 45 mole %, based on the total moles of i-iv,
   iii. cyclohexanedimethanol in an amount of 10 to 45 mole %, based on the total moles of i-iv,
   iv. trimethylolpropane in an amount of 1 to 4.5 mole %, based on the total moles of i-iv,
   v. terephthalic acid in an amount of 45-100 mole %, based on the total moles of v-vii,
   vi. isophthalic acid in an amount of 0-55 mole %, based on the total moles of v-vii, and
   vii. an acyclic aliphatic diacid in an amount of 0-15 mole %, based on the total moles of v-vii, and
b. at least one crosslinker selected from the group consisting of resole phenolic resin, isocyanate, and amino resin crosslinkers, wherein said polyester polyol has a glass transition temperature (Tg) of 50 to 110° C., acid number of 0 to 10 mgKOH/g, hydroxyl number of 10 to 40 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 70-100 as measured by ASTM D3281.

In another embodiment, this invention provides a coating composition for metal packaging comprising:

a. a polyester polyol in an amount of 70-80 weight % based on the total weight of (a), (b), and (c), which is the reaction product of the monomers comprising:
   i. 2,2,4,4-tetramethyl-1,3-cyclobutanediol in an amount of 28 to mole %, based on the total moles of i-iv,
   ii. 2-methyl-1,3-propanediol in an amount of 5 to 45 mole %, based on the total moles of i-iv,
   iii. cyclohexanedimethanol in an amount of 10 to 45 mole %, based on the total moles of i-iv,
   iv. trimethylolpropane in an amount of 1 to 4.5 mole %, based on the total moles of i-iv,
   v. terephthalic acid in an amount of 45-100 mole %, based on the total moles of v-vii, vi. isophthalic acid in an amount of 0-55 mole %, based on the total moles of v-vii, and vii. an acyclic aliphatic diacid in an amount of 0-15 mole %, based on the total moles of v-vii, b. a resole phenolic resin in an amount of 12-27 weight % based on the total weight of (a), (b), and (c), and c. isophorone diisocyanate in an amount of 3-8 weight % based on the total weight of (a), (b), and (c), wherein said polyester polyol has a glass transition temperature (Tg) of 50 to 110° C.; an acid number of 0 to 10 mgKOH/g; a hydroxyl number of 10 to 30 mgKOH/g; a number average molecular weight of 5,000 to 20,000 mgKOH/g; and a weight average molecular weight of 10,000 to 100,000; and wherein said coating has a solvent resistance of greater than 80 MEK double rubs as measured by ASTM D7835; and a wedge bend resistance (% pass) of 70-100 as measured by the method of ASTM D3281.

In another embodiment this invention provides a coating composition for use in metal packaging applications comprising:

a. a polyester polyol in an amount of 80-90 weight % based on the total weight of (a) and (b), which is the reaction product of the monomers comprising:

i. 2,2,4,4-Tetramethyl-1,3-cyclobutanediol in an amount of 28 to 60 mole %, based on the total moles of i-iv, ii. 2-methyl-1,3-propanediol in an amount of 5 to 45 mole %, based on the total moles of i-iv, iii. cyclohexanedimethanol in an amount of 10 to 45 mole %, based on the total moles of i-iv, iv. trimethylolpropane in an amount of 1 to 4.5 mole %, based on the total moles of i-iv, v. terephthalic acid in an amount of 45-100 mole %, based on the total moles of v-vii, vi. isophthalic acid in an amount of 0-55 mole %, based on the total moles of v-vii, and vii. an acyclic aliphatic diacid in an amount of 0-15 mole %, based on the total moles of v-vii, and b. a benzoguanamine formaldehyde resin in an amount of 10-20 weight % based on the total weight of (a) and (b), wherein said coating composition further comprises a titanium dioxide pigment, and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured ASTM D7835 and a wedge bend resistance (% pass) of 65-100 as measured by ASTM D3281.

In another embodiment the invention provides a coating composition for metal packaging comprising:

a. a polyester polyol in an amount of 70-85 weight % based on the total weight of (a), (b), and (c), which is the reaction product of the monomers comprising:

i. 2,2,4,4-tetramethyl-1,3-cyclobutanediol in an amount of 28 to mole %, based on the total moles of i-iv, ii. 2-methyl-1,3-propanediol in an amount of 5 to 45 mole %, based on the total moles of i-iv, iii. cyclohexanedimethanol in an amount of 10 to 45 mole %, based on the total moles of i-iv, iv. trimethylolpropane in an amount of 1 to 4.5 mole %, based on the total moles of i-iv, v. terephthalic acid in an amount of 45-100 mole %, based on the total moles of v-vii, vi. isophthalic acid in an amount of 0-55 mole %, based on the total moles of v-vii, and vii. an acyclic aliphatic diacid in an amount of 0-15 mole %, based on the total moles of v-vii, b. a benzoguanamine formaldehyde resin in an amount of 10-20 weight % based on the total weight of (a), (b), and (c), and c. isophorone diisocyanate in an amount of 5-12 weight % based on the total weight of (a), (b), and (c), wherein said coating composition further comprises a titanium dioxide pigment; and wherein said polyester polyol has a glass transition temperature (Tg) of 50 to 110° C.; an acid number of 0 to 10 mgKOH/g; a hydroxyl number of 10 to 30 mgKOH/g; a number average molecular weight of 5,000 to 20,000 mgKOH/g; and a weight average molecular weight of 10,000 to 100,000; and wherein said coating has a solvent resistance of greater than 80 MEK double rubs as measured by ASTM D7835 and a wedge bend resistance (% pass) of 75-100 as measured by the method of ASTM D3281.

In another embodiment this invention provides a white-color coating for use in metal packaging applications comprising:

a. a polyester polyol in an amount of 80-90 weight % based on the total weight of (a) and (b), which is the reaction product of the monomers comprising:

i. 2,2,4,4-Tetramethyl-1,3-cyclobutanediol (TMCD) in an amount of 28 to 60 mole %, based on the total moles of i-iv, ii. 2-methyl-1,3-propanediol (MPdiol) in an amount of 5 to 45 mole %, based on the total moles of i-iv, iii. neopentyl glycol (NPG) in an amount of 10 to 45 mole %, based on the total moles of i-iv, iv. trimethylolpropane (TMP) in an amount of 1 to 4.5 mole %, based on the total moles of i-iv, v. terephthalic acid (TPA) in an amount of 80-100 mole %, based on the total moles of v-vii, vi. isophthalic acid (IPA) in an amount of 0-20 mole %, based on the total moles of v-vii, and vii. an acyclic aliphatic diacid in an amount of 0-15 mole %, based on the total moles of v-vii, and b. a benzoguanamine formaldehyde resin in an amount of 10-20 weight % based on the total weight of (a) and (b), wherein said coating composition further comprises a titanium dioxide pigment, and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured ASTM D7835 and a wedge bend resistance (% pass) of 65-100 as measured by ASTM D3281.

In yet another embodiment, this invention provides a white-color coating having improved coating properties for metal packaging applications, which comprises:

a. a polyester polyol in an amount of 70-85 weight % based on the total weight of (a), (b), and (c), which is the reaction product of the monomers comprising:

i. 2,2,4,4-Tetramethyl-1,3-cyclobutanediol (TMCD) in an amount of 28 to 60 mole %, based on the total moles of i-iv, ii. 2-methyl-1,3-propanediol (MPdiol) in an amount of 5 to 45 mole %, based on the total moles of i-iv, iii. neopentyl glycol (NPG) in an amount of 10 to 45 mole %, based on the total moles of i-iv, iv. trimethylolpropane (TMP) in an amount of 1 to 4.5 mole %, based on the total moles of i-iv, v. terephthalic acid (TPA) in an amount of 80-100 mole %, based on the total moles of v-vii, vi. isophthalic acid (IPA) in an amount of 0-20 mole %, based on the total moles of v-vii, and vii. an acyclic aliphatic diacid in an amount of 0-15 mole %, based on the total moles of v-vii, b. a benzoguanamine formaldehyde resin in an amount of 10-20 weight % based on the total weight of (a), (b), and (c), and c. isophorone diisocyanate (IPDI) in an amount of 5-12 weight based on the total weight of (a), (b), and (c), wherein said coating composition further comprises a titanium dioxide pigment. and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 75-100 as measured by ASTM D3281.

In yet another embodiment, this invention provides a coating having improved coating properties for metal packaging applications, which comprises:

a. a polyester polyol in an amount of 70-80 weight % based on the total weight of (a), (b), and (c), which is the reaction product of the monomers comprising:

i. 2,2,4,4-Tetramethyl-1,3-cyclobutanediol (TMCD) in an amount of 28 to 60 mole %, based on the total moles of i-iv, ii. 2-methyl-1,3-propanediol (MPdiol) in an amount of 5 to 45 mole %, based on the total moles of i-iv, iii. neopentyl glycol (NPG) in an amount of 10 to 45 mole %, based on the total moles of i-iv, iv. trimethylolpropane (TMP) in an amount of 1 to 4.5 mole %, based on the total moles of i-iv, v. terephthalic acid (TPA) in an amount of 80-100 mole %, based on the total moles of v-vii, vi. isophthalic acid (IPA) in an amount of 0-20 mole %, based on the total moles of v-vii, and vii. an acyclic aliphatic diacid in an amount of 0-15 mole %, based on the total moles of v-vii, b. a resole phenolic resin in an amount of 12-27 weight % based on the total weight of (a), (b), and (c), and c. isophorone diisocyanate (IPDI) in an amount of 3-8 weight based on the total weight of (a), (b), and (c), wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 70-100 as measured by the method of ASTM D3281.

BRIEF DESCRIPTION OF THE DRAWING

FIG. 1 illustrates a modified Metal Bead Roller forming beads on a metal sheet.

DETAILED DESCRIPTION

Definitions:

In this specification and in the claims that follow, reference will be made to a number of terms, which shall be defined to have the following meanings.

"Alcohol" means a chemical containing one or more hydroxyl groups.

"Aldehyde" means a chemical containing one or more —C(O)H groups.

"Acyclic" means a compound or molecule having no rings of atoms in the compound's structure.

"Aliphatic" means a compound having a non-aromatic structure.

"Diacid" means a compound having two carboxyl functional groups.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

"Chosen from" as used herein can be used with "or" or "and." For example, Y is chosen from A, B, and C means Y can be individually A, B, or C. Alternatively, Y is chosen from A, B, or C means Y can be individually A, B, or C,; or a combination of A and B, A and C, B and C, or A, B, and C.

As used herein numerical ranges are intended to include the beginning number in the range and the ending number in the range and all numerical values and ranges in between the beginning and ending range numbers. For example, the range 40° C. to 60° C. includes the ranges 40° C. to 59° C., 41° C. to 60° C., 41.5° C. to 55.75° C. and 40°, 41°, 42°, 43°, etc. through 60° C.

The present inventors have unexpectedly discovered that coating compositions based on certain TMCD polyester polyol compositions are capable of providing a good balance of desirable coating properties, such as solvent resistance, acid resistance, retort resistance, microcracking resistance, and bending ability, for metal packaging applications.

In one embodiment of the invention, there is provided a coating composition having improved coating properties for metal packaging application, which comprises:

a. a polyester polyol, which is the reaction product of the monomers comprising:
   i. 2,2,4,4-Tetramethyl-1,3-cyclobutanediol (TMCD) in an amount of 28 to 60 mole %, based on the total moles of i-iv,
   ii. 2-methyl-1,3-propanediol (MPdiol) in an amount of 5 to 45 mole %, based on the total moles of i-iv,
   iii. cyclohexanedimethanol (CHDM) in an amount of 10 to 45 mole %, based on the total moles of i-iv,
   iv. trimethylolpropane (TMP) in an amount of 1 to 4.5 mole %, based on the total moles of i-iv,
   v. terephthalic acid (TPA) in an amount of 45-100 mole %, based on the total moles of v-vii,
   vi. isophthalic acid (IPA) in an amount of 0-55 mole %, based on the total moles of v-vii, and
   vii. an acyclic aliphatic diacid in an amount of 0-15 mole %, based on the total moles of v-vii, and
b. one or more crosslinkers selected from the group consisting of resole phenolic resin, isocyanate, and amino resin crosslinkers, wherein said polyester polyol has a glass transition temperature (Tg) of 50 to 110° C., acid number of 0 to 10 mgKOH/g, hydroxyl number of 10 to 40 mgKOH/g, number average molecular weight of 5,000 to 20,000 mgKOH/g, and weight average molecular weight of 10,000 to 100,000; and wherein said coating has a solvent resistance of greater than 50 MEK double rubs as measured by ASTM D7835 and a wedge bend resistance (% pass) of 70-100 as measured by ASTM D3281.

In a further embodiment, said coating has a microcracking resistance rating of 2-5, a total retort resistance rating (%) of 70-100, and a 5% acetic acid vapor resistance rating (%) of 40-100, as measured by the methods specified in the example section.

In some embodiments of the invention, said TMCD (i) is in an amount of 28-60, 35-58, or 45-55 mole %, based on the total moles of (i)-(iv).

In some embodiments of the invention, said MPdiol (ii) is in an amount of 5-50, 6-30, 8-15, 10-45, 15-40, 20-35, or 25-50 mole, based on the total moles of (i)-(iv).

In some embodiments of the invention, said CHDM (iii) is in an amount of 10-45, 20-43, 30-40, or 10-40 mole %; based on the total moles of (i)-(iv).

In some embodiments of the invention, said TMP (iv) is in an amount of 1-4.5, 1.5-4.2, 2-4, or 1-4 mole %; based on the total moles of (v)-(vii).

In some embodiments of the invention, said TPA (v) is in an amount of 45-100, 47-90, 50-80, or 60-100 mole %; based on the total moles of (v)-(vii).

In some embodiments of the invention, said IPA (vi) is in an amount of 0-55, 8-51, 16-46, or 0-40 mole %; based on the total moles of (v)-(vii).

In some embodiments of the invention, said acyclic aliphatic diacid (vii) is in an amount of 0-15, 2-10, or 4-8 mole %; based on the total moles of (v)-(vii).

In another embodiment, TMCD (i) is in an amount of 45-55 mole %, based on the total moles of (i)-(iv), MPdiol (ii) is in an amount of 8-15 mole %, based on the total moles of (i)-(iv), CHDM (iii) is in an amount of 30-40 mole %, based on the total moles of (i)-(iv), TMP (iv) is in an amount of 2-4 mole % based on the total moles of (i)-(iv), TPA (v) is in an amount of 50-80 mole % based on the total moles of (v)-(vii), IPA (vi) is in an amount of 6-46 mole % based on the total moles of (v)-(vii), and acyclic aliphatic diacid (vii) is in an amount of 4-8 mole %; based on the total moles of (v)-(vii).

In yet another embodiment, TMCD (i) is in an amount of 28-60 mole % based on the total moles of (i)-(iv), MPdiol (ii) is in an amount of 25-50 mole % based on the total moles of (i)-(iv), CHDM (iii) is in an amount of 10-40 mole % based on the total moles of (i)-(iv), TMP (iv) is in an amount of 1-4 mole % based on the total moles of (i)-(iv), TPA (v) is in an amount of 60-100 mole % based on the total moles of (v)-(vii), IPA (vi) is in an amount of 0-40 mole % based on the total moles of (v)-(vii), and acyclic aliphatic diacid (vii) is in an amount of 0-15 mole %; based on the total moles of (v)-(vii).

Said cyclohexanedimethanol includes 1,4-cyclohexanedimethanol (1,4-CHDM), 1,3-cyclohexanedimethanol (1,3-CHDM), 1,2-cyclohexanedimethanol (1,2-CHDM), and mixtures thereof. Desirably, said cyclohexanedimethanol is 1,4-CHDM, 1,3-CHDM, or a mixture thereof. In one embodiment, said cyclohexanedimethanol is 1,4-CHDM.

Said TPA includes terephthalic acid and its esters such as dimethyl terephthalate.

Said IPA includes isophthalic acid and its esters such as dimethyl isophthalate.

Said acyclic aliphatic diacid includes $C_4$-$C_{12}$ diacids and their esters, such as succinic acid, adipic acid, sebacic acid, dodecanedioic acid, and their methyl esters; and (hydrogenated) dimer acid ($C_{36}$). Desirably, when longer chain diacids (>$C_{10}$) are used, they are at a smaller ratio such as 1-5, 1-4, 1-3, or 1-2 mole %. In one embodiment, said acyclic aliphatic diacid is adipic acid at a ratio of 4-8 mole %.

Said polyester polyol has a glass transition temperature (Tg) of 50-110° C., 55-105° C., 60-100° C., 65-100° C., 70-100° C., 75-100° C., 80-100° C., 70-95° C., 75-95° C., 80-95° C., 70-90° C., 75-90° C., or 80-90° C.

Said polyester polyol has a number average weight of 5,000-20,000, 7,000-20,000, or 10,000-20,000 g/mole; weight average weight of 10,000-100,000, 20,000-100,000, 30,000-1000,00, or 30,000-80,000 g/mole.

Said polyester polyol has an acid number of 0-10, 0-8, 0-5, 0-3, 0-2, 0-1-5, 1-4, 1-3, 2-5, or 3-5 mgKOH/g.

Said polyester polyol has a hydroxyl number of 10-40, 11-35, 12-30, 13-25, or 14-20, 10-30, or 10-20 mgKOH/g.

Said polyester polyol has an inherent viscosity of 0.05-0.8, 0.1-0.7, 0.2-0.7, 0.3-0.7, 0.4-0.7, 0.5-0.7, 0.6-0.7, 0.1-0.6, 0.2-0.6, 0.3-0.6, 0.4-0.6, 0.5-0.6, 0.1-0.5, 0.2-0.5, 0.3-0.5, 0.4-0.5, 0.1-0.4, 0.2-0.4, 0.3-0.4, 0.1-0.3, or 0.2-0.3 dL/g (determined at 25° C., using 0.5 weight % solution in 60/40 phenol/1,1,2,2-tetrachloroethane by weight).

In another embodiment, the coating composition of the present invention comprises said polyester polyol (a) in an amount of 50-90 weight % and said crosslinker (b) in an amount of 10-50 weight %, based on the total weight of (a) and (b). In some embodiments, the polyester polyol (a) is in 55-85, 60-80, 65-85, 65-80, 65-75, 70-90, 70-85, 70-80, 75-85, 80-90, or 80-85 weight %; and the crosslinker (b) in 15-45, 20-40, 15-35, 20-35, 25-35, 10-30, 15-30, 20-30, 15-25, 10-20, or 15-20 weight %, based on the total weight of (a) and (b).

Said crosslinker (b) is one or more crosslinker selected from the group consisting of resole phenolic resin, isocyanate, and amino resin crosslinkers or mixtures thereof.

Desirably, the crosslinker is resole phenolic resin, or isocyanate, or a mixture thereof.

Said resole phenolic resin contains the residues of un-substituted phenol and/or meta-substituted phenols. These particular resole resins exhibit good reactivity with said polyester polyol (a). Desirably, the amount of the resole phenolic resin is at least 50 wt. %, or greater than 60 wt. %, or greater than 70 wt. %, or greater than 80 wt. %, or greater than 90 wt. %, based on the weight of all cross-linker compounds in the resin.

The resole phenolic resin present in the crosslinking composition contains methylol groups on the phenolic rings. Phenolic resins having methylol functionalities are referred to as resole type phenolic resins. As is known in the art, the methylol group ($—CH_2OH$) may be etherated with an alcohol and present as $—CH_2OR$, wherein R is C1-C8 alkyl group, in order to improve resin properties such as storage stability and compatibility. For purpose of the description, the term "methylol" used herein includes both $—CH_2OH$ and $—CH_2OR$ and an un-substituted methylol group is $CH_2OH$. Said methylol groups (either $—CH_2OH$ or $—CH_2OR$) are the end groups attached to the resole resins. The methylol groups are formed during the resole resin synthesis and can further react with another molecule to form ether or methylene linkages leading to macromolecules.

The phenolic resin contains the residues of un-substituted phenols or meta-substituted phenols. When starting with phenol or meta-substituted phenols to make a resole, the para and ortho positions are both available for bridging reactions to form a branched network with final methylol end groups on the resin being in the para or ortho positions relative to the phenolic hydroxyl group. To make the phenolic resole, a phenol composition is used as a starting material. The phenol composition contains un-substituted and/or meta-substituted phenols. The amount of un-substituted, meta-substituted, or a combination of the two, that is present in the phenol compositions used as a reactant to make the phenolic resole resin, is at least 50 wt. %, or at least 60 wt. %, or at least 70 wt. %, or at least 75 wt. %, or at least 80 wt. %, or at least 85 wt. %, or at least 90 wt. %, or at least 95 wt. %, or at least 98 wt. %, based on the weight of the phenol composition used as a reactant starting material.

The phenol composition is reacted with a reactive compound such as an aldehyde at an aldehyde:phenol molar ratio (using aldehyde as an example) of greater than 1:1, or at least 1.05:1, or at least 1.1:1, or at least 1.2:1, or at least 1.25:1, or at least 1.3:1, or at least 1.35:1, or at least 1.4:1, or at least 1.45:1, or at least 1.5:1, or at least 1.55:1, or at least 1.6:1, or at least 1.65:1, or at least 1.7:1, or at least 1.75:1, or at least 1.8:1, or at least 1.85:1, or at least 1.9:1, or at least 1.95:1, or at least 2:1. The upper amount of aldehyde is not limited and can be as high as 30:1, but generally is up to 5:1, or up to 4:1, or up to 3:1, or up to 2.5:1. Typically, the ratio of aldehyde:phenol is at least 1.2:1 or more, or 1.4:1 or more or 1.5:1 or more, and typically up to 3:1. Desirably, these ratios also apply to the aldehyde/unsubstituted phenol or meta-substituted phenol ratio.

The resole phenolic resin can contain an average of at least 0.3, or at least 0.4, or at least 0.45, or at least 0.5, or at least 0.6, or at least 0.8, or at least 0.9 methylol groups per one phenolic hydroxyl group, and "methylol" includes both $—CH_2OH$ and $—CH_2OR$.

The phenolic resin obtained by the condensation of phenols with aldehydes of the general formula (RCHO)n, where R is hydrogen or a hydrocarbon group having 1 to 8 carbon atoms and n is 1, 2, or 3. Examples include formaldehyde, paraldehyde, acetaldehyde, glyoxal, propionaldehyde, furfuraldehyde, or benzaldehyde. Desirably, the phenolic resin is the reaction product of phenols with formaldehyde.

At least a part of the crosslinker in (b) comprises a resole type phenolic resin that is prepared by reacting either un-substituted phenol or meta-substituted phenol or a combination thereof with an aldehyde. The unsubstituted phenol is phenol ($C_6H_5OH$). Examples of meta-substituted phenols include m-cresol, m-ethylphenol, m-propylphenol, m-butylphenol, moctylphenol, m-alkylphenol, m-phenylphenol, m-alkoxyphenol, 3,5-xylenol, 3,5-diethyl phenol, 3,5-dibutyl phenol, 3,5-dialkylphenol, 3,5-dicyclohexyl phenol, 3,5-dimethoxy phenol, 3-alkyl-5-alkyoxy phenol, and the like.

Although other substituted phenol compounds can be used in combination with said un-substituted phenols or meta-substituted phenols for making phenolic resins, it is desirable that at least 50%, or at least 70%, or at least 80%, or at least 90%, or at least 95%, or at least 98%, or at least 100% of the phenolic compounds used to make the resole resin are unsubstituted phenol or meta-substituted phenol.

In one aspect, the resole phenolic resin used in this invention comprises residues of m-substituted phenol.

Examples of suitable commercial phenolic resins include, but are not limited to, PHENODUR® PR 516/60B (based on cresol and formaldehyde) available from Allnex, PHENODUR® PR 371/70B (based on unsubstituted phenol and formaldehyde) also available from Allnex, and CURAPHEN 40-856 B60 (based on m-cresol, p-cresol, and formaldehyde) available from Bitrez.

The phenolic resins are desirably heat curable. The phenolic resin is desirably not made by the addition of bisphenol A, F, or S (collectively "BPA").

The resole is desirably of the type that is soluble in alcohol. The resole resin can be liquid at 25° C. The resole resin can have a weight average molecular weight from 200 to 2000, generally from 300 to 1000, or from 400 to 800, or from 500 to 600.

The isocyanate crosslinker suitable for this invention may be blocked or unblocked isocyanate type. Examples of suitable isocyanate crosslinkers include, but are not limited to, 1,6-hexamethylene diisocyanate, methylene bis(4-cyclohexyl isocyanate), and isophorone diisocyanate. Desirably, the isocyanate crosslinker is isophorone diisocyanate (IPDI) or blocked IPDI available from COVESTRO as Desmodur® BL 2078/2.

In some embodiments, the crosslinker (b) is a mixture of CURAPHEN 40-856 B60 available from Bitrez and blocked isophorone diisocyanate (IPDI).

In another embodiment, the crosslinker (b) is a mixture of resole phenolic resin in an amount of 70-90 weight % and isocyanate in an amount of 10-30 weight %, based on the total weight of the crosslinkers.

In addition to resole phenolic resin and isocyanate, said crosslinker (b) may also be amino resin. The amino resin crosslinker (or cross-linking agent) can be a melamine-formaldehyde type or benzoguanamine-formaldehyde type cross-linking agent, i.e., a cross-linking agent having a plurality of $—N(CH_2OR_3)_2$ functional groups, wherein $R_3$ is C1-C4 alkyl, preferably methyl.

In still another embodiment, the crosslinker (b) is a mixture of amino resin in an amount of 50-70 weight % and isocyanate in an amount of 30-50 weight %, based on the total weight of the crosslinkers.

In general, the amino cross-linking agent may be selected from compounds of the following formulae, wherein $R^3$ is independently $C_1$-$C_4$ alkyl:

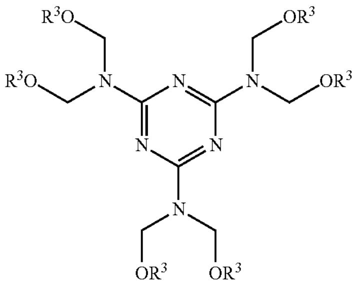

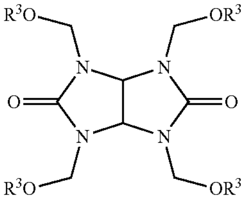

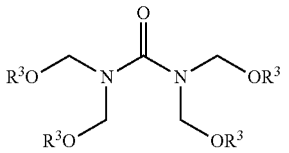

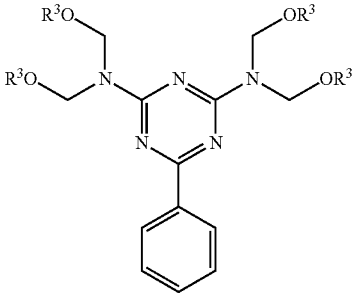

The amino containing cross-linking agents are desirably hexamethoxymethylmelamine, hexabutoxymethylmelamine, tetramethoxymethylbenzoguanamine, tetrabutoxymethylbenzoguanamine, tetramethoxymethylurea, mixed butoxy/methoxy substituted melamines, and the like.

Desirably, in all the types of thermosetting compositions, the cross-linker composition contains greater than 50 wt. %, or greater than 60 wt. %, or greater than 70 wt. %, or greater than 80 wt. %, or greater than 90 wt. %, resole phenolic resin, based on the weight of the cross-linker composition. In addition to or in the alternative, the remainder of the cross-linking compounds in the cross-linking composition, if any, are amine based crosslinking compounds as described above and/or isocyanate crosslinker.

Any of the thermosetting compositions of the invention can also include one or more cross-linking catalysts. Representative crosslinking catalysts include from carboxylic acids, sulfonic acids, tertiary amines, tertiary phosphines, tin compounds, or combinations of these compounds. Some specific examples of crosslinking catalysts include p-toluenesulfonic acid, phosphoric acid, the NACURE™ 155, 5076, 1051, and XC-296B catalysts sold by King Industries, BYK 450, 470, available from BYK-Chemie U.S.A., methyl tolyl sulfonimide, p-toluenesulfonic acid, dodecylbenzene sulfonic acid, dinonylnaphthalene sulfonic acid, and dinonylnaphthalene disulfonic acid, benzoic acid, triphenylphosphine, dibutyltindilaurate, and dibutyltindiacetate.

The crosslinking catalyst used in the present invention may depend on the type of crosslinker that is used in the coating composition. For example, the crosslinker can comprise a melamine or "amino" crosslinker and the crosslinking catalyst can comprise p-toluenesulfonic acid, phosphoric acid, unblocked and blocked dodecylbenzene sulfonic (abbreviated herein as "DDBSA"), dinonylnaphthalene sulfonic acid (abbreviated herein as "DNNSA") and dinonylnaphthalene disulfonic acid (abbreviated herein as "DNNDSA"). Some of these catalysts are available commercially such as, for example, NACURE™ 155, 5076, 1051, 5225, and XC-296B (available from King Industries), BYK-CATALYSTS™ (available from BYK-Chemie USA), and CYCAT™ catalysts (available from Cytec Surface Specialties). The coating compositions of the invention can comprise one or more isocyanate crosslinking catalysts such as, for example, FASCAT™ 4202 (dibutyltindilaurate), FASCAT™ 4200 (di butyltindiacetate, both available from Arkema), DABCO™ T-12 (available from Air Products) and K-KAT™ 348, 4205, 5218, XC-6212™ non-tin catalysts (available from King Industries), and tertiary amines.

The coating composition can contain an acid or base catalyst in an amount ranging from 0.1 to 2 weight %, based on the total weight of any of the aforementioned curable polyester resins and the crosslinker composition.

In another embodiment, the coating composition of the present invention further comprises one or more organic solvents. Suitable organic solvents include xylene, ketones (for example, methyl amyl ketone), 2-butoxyethanol, ethyl-3-ethoxypropionate, toluene, butanol, cyclopentanone, cyclohexanone, ethyl acetate, butyl acetate, Aromatic 100 and Aromatic 150 (both available from ExxonMobil), and other volatile inert solvents typically used in industrial baking (i.e., thermosetting) enamels, mineral spirits, naptha, toluene, acetone, methyl ethyl ketone, methyl isoamyl ketone, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate (available commercially from Eastman Chemical Company under the trademark TEXANOL™), or combinations thereof.

The amount of solvents is desirably at least 20 wt. %, or at least 25 wt. %, or at least 30 wt. %, or at least 35 wt. %, or at least 40 wt. %, or at least 45 wt. %, or at least 50 wt. %, or at least 55 wt. % based on the weight of the solvent containing coating composition. Additionally, or in the alternative, the amount of organic solvents can be up to 85 wt. % based on the weight of the coating composition.

In some embodiments of the invention, the coating has a solvent resistance as measured by the method of ASTM D7835 of greater than 50 MEK double rubs, or greater than 70 MEK double rubs, or greater than 90 MEK double rubs or greater than 100 MEK double rubs, or 50 to 100, 70 to 100, or 90 to100 MEK double rubs.

In some embodiments of the invention, the coating has a wedge bend resistance of 70-100, 75-100, or 80-100 as measured by the method of ASTM D3281.

In some embodiments of the invention, the coating has a microcracking resistance rating of 2-5, 2.5-5, or 3-5.

In some embodiments of the invention, the coating has a total retort resistance rating (%) of 70-100, 80-100, or 90-100.

In some embodiments of the invention, the coating has a 5% acetic acid vapor resistance rating (%) of 40-100, 50-100, 60-100, or 70-100 as measured by the methods specified in the Example section.

In a further embodiment, this invention provides a coating composition for metal packaging applications comprising:

a. a polyester polyol in an amount of 70-80 weight % based on the total weight of (a), (b), and (c), which is the reaction product of the monomers comprising:
   i. 2,2,4,4-Tetramethyl-1,3-cyclobutanediol (TMCD) in an amount of 28 to 60 mole %, based on the total moles of i-iv,
   ii. 2-methyl-1,3-propanediol (MPdiol) in an amount of 5 to 45 mole %, based on the total moles of i-iv,
   iii. cyclohexanedimethanol (CHDM) in an amount of 10 to 45 mole %, based on the total moles of i-iv,
   iv. trimethylolpropane (TMP) in an amount of 1 to 4.5 mole %, based on the total moles of i-iv,
   v. terephthalic acid (TPA) in an amount of 45-100 mole %, based on the total moles of v-vii,
   vi. isophthalic acid (IPA) in an amount of 0-55 mole %, based on the total moles of v-vii, and
   vii. an acyclic aliphatic diacid in an amount of 0-15 mole %, based on the total moles of v-vii,
b. a resole phenolic resin in an amount of 12-27 weight % based on the total weight of (a), (b), and (c), and
c. isophorone diisocyanate (IPDI) in an amount of 3-8 weight % based on the total weight of (a), (b), and (c), wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 70-100 as measured by the method of ASTM D3281.

In a further embodiment, said coating has a microcracking resistance rating of 3.5-5, a total retort resistance rating (%) of 80-100, and a 5% acetic acid vapor resistance rating (%) of 50-100, as measured by the methods specified in the example section.

The coating composition may also comprise at least one pigment. Typically, the pigment is present in an amount of about 20 to about 60 weight percent, based on the total weight of the composition. Examples of suitable pigments include titanium dioxide, barytes, clay, calcium carbonate, and CI Pigment White 6 (titanium dioxide). For example, the solvent-borne, coating formulations can contain titanium dioxide as the white pigment available from CHEMOURS as Ti-Pure™ R 900.

Thus, in another embodiment, this invention provides a polyester composition for use in white-color coatings.

In another embodiment this invention provides a white-color coating for use in metal packaging applications comprising:

a. a polyester polyol in an amount of 80-90 weight % based on the total weight of (a) and (b), which is the reaction product of the monomers comprising:
   i. 2,2,4,4-Tetramethyl-1,3-cyclobutanediol (TMCD) in an amount of 28 to 60 mole %, based on the total moles of i-iv,
   ii. 2-methyl-1,3-propanediol (MPdiol) in an amount of 5 to 45 mole %, based on the total moles of i-iv,
   iii. cyclohexanedimethanol (CHDM) in an amount of 10 to 45 mole %, based on the total moles of i-iv,
   iv. trimethylolpropane (TMP) in an amount of 1 to 4.5 mole %, based on the total moles of i-iv,
   v. terephthalic acid (TPA) in an amount of 45-100 mole %, based on the total moles of v-vii,
   vi. isophthalic acid (IPA) in an amount of 0-55 mole %, based on the total moles of v-vii, and
   vii. an acyclic aliphatic diacid in an amount of 0-15 mole %, based on the total moles of v-vii, and
b. a benzoguanamine formaldehyde resin in an amount of 10-20 weight % based on the total weight of (a) and (b), wherein said coating composition further comprises a titanium dioxide pigment, and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured ASTM D7835 and a wedge bend resistance (% pass) of 65-100 as measured by ASTM D3281. In a further embodiment, said coating has a total retort resistance rating (%) of 70-100, and a 5% acetic acid vapor resistance rating (%) of 40-100, as measured by the methods specified in the example section.

In yet another embodiment, this invention provides a white-color coating having improved coating properties for metal packaging applications, which comprises:

a. a polyester polyol in an amount of 70-85 weight % based on the total weight of (a), (b), and (c), which is the reaction product of the monomers comprising:
   i. 2,2,4,4-Tetramethyl-1,3-cyclobutanediol (TMCD) in an amount of 28 to 60 mole %, based on the total moles of i-iv,
   ii. 2-methyl-1,3-propanediol (MPdiol) in an amount of 5 to 45 mole %, based on the total moles of i-iv,
   iii. cyclohexanedimethanol (CHDM) in an amount of 10 to 45 mole %, based on the total moles of i-iv,
   iv. trimethylolpropane (TMP) in an amount of 1 to 4.5 mole %, based on the total moles of i-iv,
   v. terephthalic acid (TPA) in an amount of 45-100 mole %, based on the total moles of v-vii,
   vi. isophthalic acid (IPA) in an amount of 0-55 mole %, based on the total moles of v-vii, and
   vii. an acyclic aliphatic diacid in an amount of 0-15 mole %, based on the total moles of v-vii,
b. a benzoguanamine formaldehyde resin in an amount of 10-20 weight % based on the total weight of (a), (b), and (c), and
c. isophorone diisocyanate (IPDI) in an amount of 5-12 weight % based on the total weight of (a), (b), and (c), wherein said coating composition further comprises a titanium dioxide pigment. and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 75-100 as measured by ASTM D3281. In a further embodiment, said coating has a total retort resistance rating (%) of 80-100 and a 5% acetic acid vapor resistance rating (%) of 60-100, as measured by the methods specified in the example section.

Examples of said benzoguanamine formaldehyde resin include n-butylated benzoguanamine resin available from INEOS as Maprenal BF-891 or -892 and methylated benzoguanamine resin available from INEOS as Maprenal BF-984, -986, or -987.

In another embodiment, the polyester polyol portion of the coating is the reaction product of monomers selected from the group consisting essentially of:

i. 2,2,4,4-tetramethyl-1,3-cyclobutanediol;
ii. 2-methyl-1,3-propanediol;
iii. cyclohexanedimethanol;
iv. trimethylolpropane;
v. terephthalic acid; and
vi. isophthalic acid.

In another embodiment the polyester polyol portion of the coating is the reaction product of monomers selected from the group consisting of:

i. 2,2,4,4-tetramethyl-1,3-cyclobutanediol;
ii. 2-methyl-1,3-propanediol;
iii. cyclohexanedimethanol;
iv. trimethylolpropane;
v. terephthalic acid; and
vi. isophthalic acid.

After formulation, the coating composition can be applied to a substrate or article. Thus, a further aspect of the present invention is a shaped or formed article that has been coated with the coating compositions of the present invention. The substrate can be any common substrate such as aluminum, tin, steel or galvanized sheeting, and the like. The coating composition can be coated onto a substrate using techniques known in the art, for example, by spraying, draw-down, roll-coating, etc., about 0.1 to about 4 mils (1 mil=25 μm), or 0.5 to 3, or 0.5 to 2, or 0.5 to 1 mils of wet coating onto a substrate. The coating can be cured at a temperature of about 50° C. to about 230° C., for a time period that ranges from about 5 seconds to about 90 minutes and allowed to cool. Examples of coated articles include metal cans for food and beverages, in which the interiors are coated with the coating composition of the present invention.

In another embodiment this invention provides a white-color coating for use in metal packaging applications comprising:

a. a polyester polyol in an amount of 80-90 weight % based on the total weight of (a) and (b), which is the reaction product of the monomers comprising:
   i. 2,2,4,4-Tetramethyl-1,3-cyclobutanediol (TMCD) in an amount of 28 to 60 mole %, based on the total moles of i-iv,
   ii. 2-methyl-1,3-propanediol (MPdiol) in an amount of 5 to 45 mole %, based on the total moles of i-iv,
   iii. neopentyl glycol (NPG) in an amount of 10 to 45 mole %, based on the total moles of i-iv,
   iv. trimethylolpropane (TMP) in an amount of 1 to 4.5 mole %, based on the total moles of i-iv,
   v. terephthalic acid (TPA) in an amount of 80-100 mole %, based on the total moles of v-vii,
   vi. isophthalic acid (IPA) in an amount of 0-20 mole %, based on the total moles of v-vii, and
   vii. an acyclic aliphatic diacid in an amount of 0-15 mole %, based on the total moles of v-vii, and
b. a benzoguanamine formaldehyde resin in an amount of 10-20 weight % based on the total weight of (a) and (b), wherein said coating composition further comprises a titanium dioxide pigment, and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured ASTM D7835 and a wedge bend resistance (% pass) of 65-100 as measured by ASTM D3281.

In yet another embodiment, this invention provides a white-color coating having improved coating properties for metal packaging applications, which comprises:

a. a polyester polyol in an amount of 70-85 weight % based on the total weight of (a), (b), and (c), which is the reaction product of the monomers comprising:
   i. 2,2,4,4-Tetramethyl-1,3-cyclobutanediol (TMCD) in an amount of 28 to 60 mole %, based on the total moles of i-iv,
   ii. 2-methyl-1,3-propanediol (MPdiol) in an amount of 5 to 45 mole %, based on the total moles of i-iv,
   iii. neopentyl glycol (NPG) in an amount of 10 to 45 mole %, based on the total moles of i-iv,
   iv. trimethylolpropane (TMP) in an amount of 1 to 4.5 mole %, based on the total moles of i-iv,
   v. terephthalic acid (TPA) in an amount of 80-100 mole %, based on the total moles of v-vii,
   vi. isophthalic acid (IPA) in an amount of 0-20 mole %, based on the total moles of v-vii, and
   vii. an acyclic aliphatic diacid in an amount of 0-15 mole %, based on the total moles of v-vii,
b. a benzoguanamine formaldehyde resin in an amount of 10-20 weight % based on the total weight of (a), (b), and (c), and
c. isophorone diisocyanate (IPDI) in an amount of 5-12 weight based on the total weight of (a), (b), and (c), wherein said coating composition further comprises a titanium dioxide pigment. and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 75-100 as measured by ASTM D3281.

In yet another embodiment, this invention provides a coating having improved coating properties for metal packaging applications, which comprises:

a. a polyester polyol in an amount of 70-80 weight % based on the total weight of (a), (b), and (c), which is the reaction product of the monomers comprising:
   i. 2,2,4,4-Tetramethyl-1,3-cyclobutanediol (TMCD) in an amount of 28 to 60 mole %, based on the total moles of i-iv,
   ii. 2-methyl-1,3-propanediol (MPdiol) in an amount of 5 to 45 mole %, based on the total moles of i-iv,
   iii. neopentyl glycol (NPG) in an amount of 10 to 45 mole %, based on the total moles of i-iv,
   iv. trimethylolpropane (TMP) in an amount of 1 to 4.5 mole %, based on the total moles of i-iv,
   v. terephthalic acid (TPA) in an amount of 80-100 mole %, based on the total moles of v-vii,
   vi. isophthalic acid (IPA) in an amount of 0-20 mole %, based on the total moles of v-vii, and
   vii. an acyclic aliphatic diacid in an amount of 0-15 mole %, based on the total moles of v-vii,
b. a resole phenolic resin in an amount of 12-27 weight % based on the total weight of (a), (b), and (c), and
c. isophorone diisocyanate (IPDI) in an amount of 3-8 weight % based on the total weight of (a), (b), and (c), wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 70-100 as measured by the method of ASTM D3281.

Thus, this invention further provides an article, of which at least a portion is coated with the coating composition of the present invention.

EXAMPLES

This invention can be further illustrated by the following examples thereof, although it will be understood that these examples are included merely for purposes of illustration and are not intended to limit the scope of the invention unless otherwise specifically indicated.

Abbreviations:

mL is milliliter; wt % is weight percent; eq is equivalent (s); hrs or h is hour(s); mm is millimeter; m is meter; ° C. is degree Celsius; min is minute; g is gram; mmol is millimole; mol is mole; kg is kilogram; L is liter; w/v is weight/volume; μL is microliter; MW is molecular weight.

Coating Test Methods:

Substrate, Coated Test Panel Preparation, Film Weight

Two electro tin plate (ETP) substrate panels were used. One panel from Lakeside Metals Inc.—0.23 mm thickness, 2.2 g/m 2 tin content, temper and annealing type T61CA, and one from Reynolds Metals Company—0.19 mm thickness, 2.2 g/$m^2$ tin content, temper and annealing type DR-8CA. The panels were coated with the formulations by casting wet films with wire wound rods, RDS 14 for pigmented and RDS 10 for gold (RDS 14 and RDS 10 available from R.D. Specialties, Inc.). This yielded a final dry film weight of approximately 14-16 grams/$m^2$ for pigmented coatings and approximately 6-8 grams/$m^2$ for coatings containing phenolic resin crosslinker, which showed gold color when cured (gold coatings), respectively. For microcracking test, the formulations were applied by casting wet films with wire wound rods—RDS 5 (available from R.D. Specialties, Inc.) which yielded a dry film weight of 3.0-3.5 gram/$m_2$. The cast panels were placed in a rack vertically. A Despatch forced air oven was preheated to a temperature of 203° C. The coated panels in the rack were then placed into the oven for 18 minutes of bake cycle time in order to allow the coatings to be baked at 200° C. Peak Metal Temperature (PMT) for 10 minutes. At the conclusion of the baking cycle, the panel rack was removed from the oven and allowed to cool to ambient temperature. A Sencon SI9600 coating thickness gauge was used to confirm the dry film weight of the applied coatings.

Wedge Bend

A coupon measuring 1.5" wide×4" long was cut from a coated panel. This coupon was tested by a Gardco coverall bend and impact tester following ASTM D 3281. To make a bend test, the coated coupon was first bent over a ⅛" (0.32 cm) steel rod. The bent coupon was placed between the parts of a butt hinge. The hinge made of two steel blocks is attached to the base below the guide tube. When the hinge is closed, it creates a wedge shape gap between the upper and lower parts ranging from ⅛" at the hinged end to zero thickness at the free end. Then the impact tool, flat face down, was dropped from a height of one or two feet onto the upper part of the hinge. Once a coated coupon was bent and impacted into a wedge shape, it was then soaked in an acidified copper sulfate solution (5 wt % copper sulfate, 15 wt % hydrochloric acid (35%), 80 wt % distilled water) for 5 minutes to make any cracks in the coating visible. Excess copper sulfate solution was removed by washing with water and blotting with a dry towel. Wedge bend failure (mm), measured by using a ruler and a lighted magnifying glass, is defined as the total length of a continuous crack along the bent edge of the coupon. The result is reported as Pass % of wedge bend which is calculated by:

$$\text{Pass \% of wedge bend} = \frac{(\text{Total length} - \text{wedge bend failure})}{\text{Total length}} \times 100\%$$

Each Pass % of wedge bend in this experiment is an average value from 3 repeated tests.

Methyl Ethyl Ketone (MEK) Double Rubs

The resistance to MEK solvent was measured using a MEK rub test machine (Gardco MEK Rub Test Machine AB-410103EN with 1 kg block). This test was carried out similar to ASTM D7835. MEK solvent resistance was reported as the number of double rubs a coated panel can withstand before the coating starts to be removed. For example, one back-and-forth motion constitutes one double rub. A maximum of 100 double rubs was set as the upper limit for each evaluation.

Sterilization Resistance Testing

A coated coupon measuring 2.5" wide×4" long was cut from the coated panel. The coupons were then placed in a 16 oz wide mouth Le Parfait glass jar half filled with the food simulant where half the coupon is above food simulant liquid and the other half is submerged in food simulant liquid. Two different food simulants were evaluated:

Lactic acid: 2% lactic acid, 98% deionized water.

Acetic Acid: 3% acetic acid, 97% deionized water.

The jars with properly closed top were placed in an autoclave, Priorclave Model PNA/QCS/EH150, for 1 hr at 131° C. Once the retort process was finished, the autoclave was allowed to depressurize to ambient conditions. After the completion of sterilization cycle, the glass jars containing the test coupons were then removed from the autoclave. The coupons were removed from the jars and washed under water and blotted dry with paper towels. The retort performance is rated on a scale of 0 (worst) to 5 (best) using a visual observation. For each food simulant, the retort performance was rated on (1) blush at vapor phase, (2) blush at liquid phase, (3) roughness at vapor phase, (4) roughness at liquid phase and (5) cross-hatch adhesion (following ASTM D 3359) at liquid phase, respectively. An overall retort performance is reported as Total Retort % calculated by:

$$\text{Total Retort \%} = \frac{\text{Sum of rating (1) to (5) from 2\% lactic acid} + \text{Sum of rating (1) to (5) from 3\% acetic acid}}{50} \times 100\%$$

Each retort rating in this experiment is an average rating from 2 replicates.

5% Acetic acid Vapor Test

To perform the test, a can end (with #307 can end dimension) was fabricated from a coated panel prepared by the standard methods and film weight. With a rubber O-ring fitted into the counter area of a fabricated can end, the can end with coating on the interior was then used as a lid and properly sealed on top of a 16 oz wide mouth Le Parfait glass jar filled with 5% Acetic acid food simulant (5% acetic acid, 95% deionized water). Like sterilization test, the jars with properly closed top were placed in an autoclave (Priorclave Model PNA/QCS/EH150) for 1 hour at 131° C. Once the retort process was finished, the autoclave was allowed to depressurize to ambient conditions. Then the glass jars with coated can ends were removed from the autoclave. The can ends were removed from the jars, washed under water and blotted dry with paper towels. Several evaluations were taken in an order:

Enamel rating was performed on a can end after this process.

Roughness on rings was rated on a scale of 0 (worst) to 5 (best).

Adhesion test (following ASTM D 3359) was performed on a can end. Adhesion at flat area and adhesion at rings were rated separately, on a scale of 0 (worst) to 5 (best) by visual observation. Adhesion rating is the average value of adhesion at flat area rating and adhesion at rings rating.

Overall Total 5% Acetic Vapor Test performance is reported as Total Vapor % and calculated by:

$$\text{Total Vapor \%} = \frac{\text{Sum of roughness rating and adhesion rating}}{10} \times 100\%$$

Microcracking Test

To execute the micro-cracking test, a beading pattern was created on a coated panel to simulate the fabrication of metal cans. As shown in FIG. 1, a coated panel (40) with a dimension of 1"×4" was inserted into the gap between the two rollers (10*a* and 10*b*) of a modified Metal Bead Roller and followed by a deformation process as running through the roller. With the function of a die, the two rollers with a large array of beading ripples (20 and 30) reproduce the beading patterns (50 and 60) from a range of can sizes (from 4 oz to 3 kg). The gap between the rollers was adjusted corresponding to the thickness of the tinplate. The film weight of coatings for this test was in a range of 3.0-3.5 gram/m$^2$. After the beading process, the uncoated area of a panel including the edges and the backside were covered by vinyl tape (Yellow Heat Treated 3M 471), and followed by a 45 minutes immersion in acidified copper sulfate solution which stained any area where cracking or micro-cracking occurred on the coating due to the process. Acidified copper sulfate solution used in the experiment consisted of 16 wt % copper sulfate, 5 wt % hydrochloric acid (35%), 79 wt % distilled water. All samples were taken out from copper sulfate solution, rinsed with water, dried with a paper towel, and evaluated for stain on a 1 to 5 scale with 5 being 0% stained area, 1 being ≥50% stained area, and 0.5 interval on rating for every 5% change on stained area. Each rating for microcracking test in this experiment is an average rating from 2 repeated tests.

Example 1: Synthesis of Polyester Polyol (Resin 1)

The polyols were produced using a resin kettle reactor controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point Aromatic 150ND (A150ND, available from Exxon-Mobil) was used to both encourage egress of the water condensate out of the reaction mixture and keep the reaction mixture from becoming excessively viscous using the standard paddle stirrer. lsophthalic acid (IPA), terephthalic acid (TPA), adipic acid (AD), 1,4-cyclohexane dimethanol (CHDM), 2,2,4,4-tetramethyl-1,3-cyclobutanediol (TMCD), 2-methyl-1,3-propanediol (MPdiol), trimethylolpropane (TMP), and Aromatic 150 were added to the reactor. Fascat 4100 (monobutyltin oxide, available from PMC Organometallix Inc.) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid, the stirring was started to encourage even heating of the mixture. At 150° C., the control of heating was switched to automated control and the temperature was ramped to 230° C. over the course of 4 hours. The reaction was held at 230° C. for 1 hour and then heated to 240° C. over the course of 1 hour. The reaction was then held at 240° C. and sampled every 1-2 hours upon clearing until the desired acid value was reached (approximately 8 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| Charge | | | | | |
|---|---|---|---|---|---|
| Raw Material | Moles | Equivalents | Weight | Charge Weight (including excess) | % Excess |
| Stage 1 | | | | | |
| IPA | 1.5750 | 3.1500 | 261.65 | 261.65 | 0 |
| TPA | 1.7500 | 3.5000 | 290.73 | 290.73 | 0 |
| Adipic Acid | 0.1750 | 0.3500 | 25.57 | 25.57 | 0 |
| TMCD | 1.7653 | 3.5306 | 254.57 | 272.39 | 7 |
| 1,4-CHDM | 1.2887 | 2.5773 | 185.84 | 187.69 | 1 |
| MPdiol | 0.3531 | 0.7061 | 31.81 | 32.13 | 1 |
| TMP | 0.1236 | 0.3707 | 16.58 | 17.08 | 3 |
| | | Total Charge | 1066.75 | | |
| | | Minus Condensate | 124.93 | | |
| | | Yield | 941.82 | | |

-continued

| (Catalyst) | Concentration | |
|---|---|---|
| Fascat 4100 | 400 | 0.77 |
| (Processes Solvent) | Wt. % | |
| A150ND | 10 | 120.89 |
| (Processes Solvent) | Final Wt. % | |
| A150ND | 55 | 667.08 |

Example 2: Synthesis of Polyester Polyols (Resins 2, 3, 4, & 5)

Using the same method as above, resins 2-5 were also synthesized. Table 1 lists the compositions of Resins 1-5, and Table 2 lists their resin properties.

Glass transition temperature (Tg) was determined using a Q2000 differential scanning calorimeter (DSC) from TA Instruments, New Castle, DE, US, at a scan rate of 20° C./min. Number average molecular weight (Mn) and weight average molecular weight (Mw) Mn were measured by gel permeation chromatography (GPC) using polystyrene equivalent molecular weight. Acid number was measured by using a procedure based on ASTM D7253-1 entitled “Standard Test Method for Polyurethane Raw Materials: Determination of Acidity as Acid Number for Polyether Polyols,” and hydroxyl number was measured using a procedure based on ASTM E222-1 entitled “Standard Test Methods for Hydroxyl Groups Using Acetic Anhydride.”

TABLE 1

Synthesized Polyester Polyols

| | Resin Composition as Charged | | | | | | |
|---|---|---|---|---|---|---|---|
| | Mole Ratio Based on Total Alcohols (%) | | | | Mole Ratio Based on Total Acids (%) | | |
| | TMCD | 1,4-CHDM | MPdiol | TMP | TPA | IPA | AD |
| Resin 1 | 50 | 36.5 | 10 | 3.5 | 50 | 45 | 5 |
| Resin 2 | 40.1 | 18.2 | 40.2 | 1.5 | 69.7 | 30.3 | — |
| Resin 3 | 29.6 | 30 (NPG) | 39 | 1.4 | 100 | — | — |
| Resin 4 | 41.7 | 38.5 | 19.2 | 0.6 | 49.6 | 45.9 | 4.5 |
| Resin 5 | 40 | 39 | 20 | 1 | 50 | 40 | 10 |

TABLE 2

Resin Properties of Polyester Polyols

| | Tg, C. | Mn | Mw | Acid Number Analyzed | OH Number Analyzed |
|---|---|---|---|---|---|
| Resin 1 | 96 | 13866 | 70582 | 3 | 21 |
| Resin 2 | 81 | 11636 | 33116 | 3 | 19 |
| Resin 3 | 85 | 11509 | 38195 | 5 | 16 |
| Resin 4 | 87 | 15292 | 45074 | 3 | 11 |
| Resin 5 | 75 | 11390 | 38325 | 5 | 12 |

Comparative Example 1: Synthesis of Polyester Polyol (Comparative Resin CR-1)

This example describes the synthesis of a polyester polyol having high 1,4-CHDM (50 mole %), high TMP (8 mole %), and high hydroxyl number (52.4 mgKOH/g) as compared to the inventive polyester polyol The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture from becoming to viscous using the standard paddle stirrer. lsophthalic acid (IPA), terephthalic acid (TPA), adipic acid (AD), 1,4-cyclohexane dimethanol (CHDM), 2,2,4,4-tetramethyl-1,3-cyclobutanediol (TMCD), 2-methyl-1,3-propanediol (MPdiol), trimethylolpropane (TMP), and Aromatic 150 were added to the reactor. The Fascat 4100 (monobutyltin oxide) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid, the stirring was started to encourage even heating of the mixture. At 150° C., the control of heating was switched to automated control and the temperature was ramped to 230° C. over the course of 4 hour. The reaction was held at 230° C. for 1 hour and sampled every 1-2 hours upon clearing until the desired acid value was reached (approximately 6 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| Charge | | | | | |
|---|---|---|---|---|---|
| Raw Material | Moles | Equivalents | Weight | Charge Weight (including excess) | % Excess |
| Stage 1 | | | | | |
| IPA | 1.5750 | 3.1500 | 261.65 | 261.65 | 0 |
| TPA | 1.7500 | 3.5000 | 290.73 | 290.73 | 0 |
| Adipic Acid | 0.1750 | 0.3500 | 25.57 | 25.57 | 0 |
| TMCD | 1.2135 | 2.4270 | 175.00 | 183.75 | 5 |
| 1,4-CHDM | 1.8961 | 3.7921 | 273.43 | 276.16 | 1 |
| MPdiol | 0.3792 | 0.7584 | 34.17 | 34.51 | 1 |
| TMP | 0.3034 | 0.9101 | 40.70 | 41.92 | 3 |
| | | Total Charge | 1101.25 | | |
| | | Minus Condensate | 124.89 | | |
| | | Yield | 976.36 | | |
| (Catalyst) | Concentration | | | | |
| Fascat 4100 | 400 | | | 0.79 | |
| (Processes Solvent) | Wt. % | | | | |
| A150ND | 10 | | | 123.90 | |
| (Processes Solvent) | Final Wt. % | | | | |
| A150ND | 55 | | | 686.26 | |

Comparative Example 2: Synthesis of Polyester Polyol (CR-2)

This example describes the synthesis of a polyester polyol having high TMP (4.7 mole %) and high hydroxyl number (59 mgKOH/g) as compared to the inventive polyester polyol.

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. Isophthalic acid (IPA), terephthalic acid (TPA), adipic acid (AD), 1,4-cyclohexane dimethanol (CHDM), 2,2,4,4-tetramethyl-1,3-cyclobutanediol (TMCD), 2-methyl-1,3-propanediol (MPdiol), trimethylolpropane (TMP), and Aromatic 150 were added to the reactor which was then completely assembled. The Fascat 4100 (monobutyltin oxide) was added via the sampling port and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 hours. The reaction was held at 230° C. for 1 hour and sampled every 1-2 hours upon clearing until the desired acid value was reached (approximately 6 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| Charge | | | | | |
|---|---|---|---|---|---|
| Raw Material | Moles | Equivalents | Weight | Charge Weight (including excess) | % Excess |
| Stage 1 | | | | | |
| IPA | 1.9250 | 3.8500 | 319.80 | 319.80 | 0 |
| TPA | 1.0500 | 2.1000 | 174.44 | 174.44 | 0 |
| Adipic Acid | 0.5250 | 1.0500 | 76.70 | 76.70 | 0 |
| TMCD | 1.1444 | 2.2888 | 165.03 | 173.29 | 5 |
| 1,4-CHDM | 1.3699 | 2.7398 | 197.55 | 199.53 | 1 |
| MPdiol | 0.9970 | 1.9940 | 89.83 | 90.73 | 1 |
| TMP | 0.1732 | 0.5195 | 23.23 | 23.93 | 3 |
| | | Total Charge | 1046.59 | | |

-continued

| | | | |
|---|---|---|---|
| | Minus Condensate | 124.96 | |
| | Yield | 921.64 | |
| (Catalyst) | Concentration | | |
| Fascat 4100 | 400 | | 0.75 |
| (Processes Solvent) | Wt. % | | |
| A150ND | 10 | | 117.68 |
| (Processes Solvent) | Final Wt. % | | |
| A150ND | 55 | | 646.66 |

Comparative Example 3: Synthesis of Polyester Polyol (CR-3)

This example describes the synthesis of a polyester polyol having high adipic acid (25 mole %) and high 1,4-CHDM (50 mole %) as compared to the inventive polyester polyol.

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. Isophthalic acid (IPA), terephthalic acid (TPA), adipic acid (AD), 1,4-cyclohexane dimethanol (CHDM), 2,2,4,4-tetramethyl-1,3-cyclobutanediol (TMCD), 2-methyl-1,3-propanediol (MPdiol), trimethylolpropane (TMP), and Aromatic 150 were added to the reactor which was then completely assembled. The Fascat 4100 (monobutyltin oxide) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 hours. The reaction was held at 230° C. for 1 hour and sampled every 1-2 hours upon clearing until the desired acid value was reached (approximately 3 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| Charge | | | | | |
|---|---|---|---|---|---|
| Raw Material | Moles | Equivalents | Weight | Charge Weight (including excess) | % Excess |
| Stage 1 | | | | | |
| IPA | 0.8750 | 1.7500 | 145.36 | 145.36 | 0 |
| TPA | 1.7500 | 3.5000 | 290.73 | 290.73 | 0 |
| Adipic Acid | 0.8750 | 1.7500 | 127.84 | 127.84 | 0 |
| TMCD | 1.2882 | 2.5763 | 185.76 | 195.05 | 5 |
| 1,4-CHDM | 1.7646 | 3.5292 | 254.47 | 257.02 | 1 |
| MPdiol | 0.3529 | 0.7058 | 31.80 | 32.12 | 1 |
| TMP | 0.1235 | 0.3706 | 16.57 | 17.07 | 3 |
| | | Total Charge | 1052.54 | | |
| | | Minus Condensate | 124.95 | | |
| | | Yield | 927.59 | | |
| (Catalyst) | Concentration | | | | |
| Fascat 4100 | 400 | | | 0.75 | |
| (Processes Solvent) | Wt. % | | | | |
| A150ND | 10 | | | 118.44 | |
| (Processes Solvent) | Final Wt. % | | | | |
| A150ND | 55 | | | 651.46 | |

Comparative Example 4: Synthesis of Polyester Polyol (CR-4)

This example describes the synthesis of a polyester polyol having low TPA (10 mole %), high TMP (8 mole %), and high hydroxyl number (50 mgKOH/g) as compared to the inventive polyester polyol.

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. lsophthalic acid (IPA), terephthalic acid (TPA), adipic acid (AD), 1,4-cyclohexane dimethanol (CHDM), 2,2,4,4-tetramethyl-1,3-cyclobutanediol (TMCD), 2-methyl-1,3-propanediol (MPdiol), trimethylolpropane (TMP), and Aromatic 150 were added to the reactor which was then completely assembled. The Fascat 4100 (monobutyltin oxide) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 hours. The reaction was held at 230° C. for 1 hour and sampled every 1-2 hours upon clearing until the desired acid value was reached (approximately 2 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| Charge | | | | | |
|---|---|---|---|---|---|
| Raw Material | Moles | Equivalents | Weight | Charge Weight (including excess) | % Excess |
| Stage 1 | | | | | |
| IPA | 2.9750 | 5.9500 | 494.24 | 494.24 | 0 |
| TPA | 0.3500 | 0.7000 | 58.15 | 58.15 | 0 |
| Adipic Acid | 0.1750 | 0.3500 | 25.57 | 25.57 | 0 |
| TMCD | 1.8521 | 3.7042 | 267.09 | 280.44 | 5 |
| 1,4-CHDM | 1.1853 | 2.3707 | 170.94 | 172.65 | 1 |
| MPdiol | 0.3704 | 0.7408 | 33.37 | 33.71 | 1 |
| TMP | 0.2963 | 0.8890 | 39.76 | 40.95 | 3 |
| | | Total Charge | 1089.11 | | |
| | | Minus Condensate | 124.90 | | |
| | | Yield | 964.21 | | |
| (Catalyst) | Concentration | | | | |
| Fascat 4100 | 400 | | | 0.78 | |
| (Processes Solvent) | Wt. % | | | | |
| A150ND | 10 | | | 122.94 | |
| (Processes Solvent) | Final Wt. % | | | | |
| A150ND | 55 | | | 680.17 | |

Comparative Example 5: Synthesis of Polyester Polyol (CR-5)

This example describes the synthesis of a polyester polyol having low TPA (10 mole %) and high 1,4-CHDM (50 mole %) as compared to the inventive polyester polyol.

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. lsophthalic acid (IPA), terephthalic acid (TPA), adipic acid (AD), 1,4-cyclohexane dimethanol (CHDM), 2,2,4,4-tetramethyl-1,3-cyclobutanediol (TMCD), 2-methyl-1,3-propanediol (MPdiol), trimethylolpropane (TMP), and Aromatic 150 were added to the reactor which was then completely assembled. The Fascat 4100 (monobutyltin oxide) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 hours. The reaction was held at 230° C. for 1 hour and sampled every 1-2 hours upon clearing until the desired acid value was reached (approximately 4 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| Charge | | | | | |
|---|---|---|---|---|---|
| Raw Material | Moles | Equivalents | Weight | Charge Weight (including excess) | % Excess |
| Stage 1 | | | | | |
| IPA | 2.9750 | 5.9500 | 494.24 | 494.24 | 0 |
| TPA | 0.3500 | 0.7000 | 58.15 | 58.15 | 0 |
| Adipic Acid | 0.1750 | 0.3500 | 25.57 | 25.57 | 0 |
| TMCD | 1.3517 | 2.7035 | 194.93 | 204.68 | 5 |
| 1,4-CHDM | 1.7786 | 3.5572 | 256.49 | 259.06 | 1 |
| MPdiol | 0.3557 | 0.7114 | 32.05 | 32.37 | 1 |
| TMP | 0.0711 | 0.2134 | 9.55 | 9.83 | 3 |
| | | Total Charge | 1070.97 | | |
| | | Minus Condensate | 124.92 | | |
| | | Yield | 946.04 | | |
| (Catalyst) | Concentration | | | | |
| Fascat 4100 | 400 | | | 0.76 | |
| (Processes Solvent) | Wt. % | | | | |
| A150ND | 10 | | | 120.52 | |
| (Processes Solvent) | Final Wt. % | | | | |
| A150ND | 55 | | | 664.71 | |

Comparative Example 6: Resin Properties of Synthesized Comparative Polyester Polyols Table 3 lists the compositions of comparative resins (CR-1 to CR-5), and Table 4 lists their resin properties. Glass transition temperature (Tg) was determined using a Q2000 differential scanning calorimeter (DSC) from TA Instruments, New Castle, DE, US, at a scan rate of 20° C./min. Number average molecular weight (Mn) and weight average molecular weight (Mw) Mn were measured by gel permeation chromatography (GPC) using polystyrene equivalent molecular weight. Acid number was measured by using a procedure based on ASTM D7253-1 entitled “Standard Test Method for Polyurethane Raw Materials: Determination of Acidity as Acid Number for Polyether Polyols,” and hydroxyl number was measured using a procedure based on ASTM E222-1 entitled “Standard Test Methods for Hydroxyl Groups Using Acetic Anhydride.”

TABLE 3

Synthesized Comparative Polyester Polyols

| | Resin Composition as Charged | | | | | | |
|---|---|---|---|---|---|---|---|
| | Mole Ratio Based on Total Alcohols % | | | | Mole Ratio Based on Total Acids (%) | | |
| Comparative Resin | TMCD | 1,4-CHDM | MPdiol | TMP | TPA | IPA | AD |
| CR-1 | 32 | 50 | 10 | 8 | 50 | 45 | 5 |
| CR-2 | 31 | 37.3 | 27 | 4.7 | 30 | 55 | 15 |
| CR-3 | 36.5 | 50 | 10 | 3.5 | 50 | 25 | 25 |
| CR-4 | 50 | 32 | 10 | 8 | 10 | 85 | 5 |
| CR-5 | 38 | 50 | 10 | 2 | 10 | 85 | 5 |

TABLE 4

Resin Properties of Polyester Polyols

| Comparative Resin | Tg, C. | Mn | Mw | Acid Number Analyzed | OH Number Analyzed |
|---|---|---|---|---|---|
| CR-1 | 70 | 6053 | 18844 | 5 | 52 |
| CR-2 | 56 | 6801 | 26787 | 3 | 42 |
| CR-3 | 59 | 5300 | 11461 | 3 | 23 |
| CR-4 | 73 | 5946 | 21330 | 5 | 50 |
| CR-5 | 84 | 13237 | 44507 | 3 | 15 |

Comparative Example 7: Synthesis of Polyester Polyol (Comparative Resin CR-6)

This example describes the synthesis of a polyester polyol by replacing cyclohexanedimethanol with isosorbide.

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. lsophthalic acid (IPA), terephthalic acid (TPA), adipic acid (AD), isosorbide (dianhydro-D-glucitol, IBIS), 2,2,4,4-tetramethyl-1,3-cyclobutanediol (TMCD), 2-methyl-1,3-propanediol (MPdiol), trimethylolpropane (TMP), and Aromatic 150 were added to the reactor which was then completely assembled. The Fascat 4100 (monobutyltin oxide) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 hours. The reaction was held at 230° C. for 1 hour and then heated to 240° C. over the course of 1 hour. The reaction was then held at 240° C. and sampled every 1-2 hours upon clearing until the desired acid value was reached (approximately 8 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

The polyester polyol thus prepared formed a crystalline solid, instead of a pourable liquid resin, which rendered it unfit for use.

| Charge | | | | | |
|---|---|---|---|---|---|
| Raw Material | Moles | Equivalents | Weight | Charge Weight (including excess) | % Excess |
| Stage 1 | | | | | |
| IPA | 1.5750 | 3.1500 | 261.65 | 261.65 | 0 |
| TPA | 1.7500 | 3.5000 | 290.73 | 290.73 | 0 |
| Adipic Acid | 0.1750 | 0.3500 | 25.57 | 25.57 | 0 |
| TMCD | 1.7865 | 3.5730 | 257.63 | 275.66 | 7 |
| Isosorbide | 1.3041 | 2.6083 | 190.53 | 192.44 | 1 |

-continued

| | | | | | |
|---|---|---|---|---|---|
| MPdiol | 0.3573 | 0.7146 | 32.19 | 32.51 | 1 |
| TMP | 0.1251 | 0.3752 | 16.78 | 17.28 | 3 |
| | | Total Charge | 1075.08 | | |
| | | Minus Condensate | 124.92 | | |
| | | Yield | 950.16 | | |
| (Catalyst) | Concentration | | | | |
| Fascat 4100 | 400 | | | 0.77 | |
| (Processes Solvent) | Wt. % | | | | |
| A150ND | 10 | | | 121.85 | |
| (Processes Solvent) | Final Wt. % | | | | |
| A150ND | 55 | | | 673.18 | |

Comparative Example 8: Synthesis of Polyester Polyol (CR-7)

This example describes the synthesis of a polyester polyol by replacing 1,4-cyclohexanedimethanol (1,4-CHDM) with TCDDM. TCDDM is a mixture of isomers of 4,8-bis(hydroxymethyl)tricyclo[5.2.1.0$^{2,6}$]decane. TCDDM is also known as tricyclodecanedimethanol and tricyclo[5.2.1.0$^{2,6}$]decane-4,8-dimethanol. TCDDM is available from OQ Chemicals as TCD Alcohol DM.

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. Isophthalic acid (IPA), terephthalic acid (TPA), adipic acid (AD), tricyclodecanedimethanol (TCDDM), 2,2,4,4-tetramethyl-1,3-cyclobutanediol (TMCD), 2-methyl-1,3-propanediol (MPdiol), trimethylolpropane (TMP), and Aromatic 150 were added to the reactor which was then completely assembled. The Fascat 4100 (monobutyltin oxide) was added via the sampling port after the reactor had been assembled and blanketed with nitrogen for the reaction. Additional A150/A150ND solvent was added to the Dean Stark trap to maintain the 10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 hours. The reaction was held at 230° C. for 1 hour and then heated to 240° C. over the course of 1 hour. The reaction was then held at 240° C. and sampled every 1-2 hours upon clearing until the desired acid value was reached (approximately 8 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

The resulting polyester polyol had a hydroxyl number of 20 mgKOH/g, an acid number of 5 mgKOH/g, a Tg of 102° C., and a Mn and Mw of 10197 g/mol and 35888 g/mol respectively.

| Charge | | | | | |
|---|---|---|---|---|---|
| Raw Material | Moles | Equivalents | Weight | Charge Weight (including excess) | % Excess |
| Stage 1 | | | | | |
| IPA | 1.5750 | 3.1500 | 261.65 | 261.65 | 0 |
| TPA | 1.7500 | 3.5000 | 290.73 | 290.73 | 0 |
| Adipic Acid | 0.1750 | 0.3500 | 25.57 | 25.57 | 0 |
| TMCD | 1.7686 | 3.5371 | 255.04 | 272.90 | 7 |

-continued

| | | | | | |
|---|---|---|---|---|---|
| TCDDM | 1.2911 | 2.5821 | 253.42 | 255.95 | 1 |
| MPdiol | 0.3537 | 0.7074 | 31.87 | 32.19 | 1 |
| TMP | 0.1238 | 0.3714 | 16.61 | 17.11 | 3 |
| | | Total Charge | 1134.89 | | |
| | | Minus Condensate | 124.84 | | |
| | | Yield | 1010.05 | | |
| (Catalyst) | Concentration | | | | |
| Fascat 4100 | 400 | | | 0.81 | |
| (Processes Solvent) | Wt. % | | | | |
| A150ND | 10 | | | 128.55 | |
| (Processes Solvent) | Final Wt. % | | | | |
| A150ND | 55 | | | 715.88 | |

Example 3: Preparation of Gold Coating Formulations (GF1-5 and CGF1-7)

Coating formulations intended for gold color were prepared by using Resins 1-5 and Comparative Resins, CR-1 to CR-7. The gold formulations (GF 1-3) prepared from Resins 1-5 are listed in Table 5, and the comparative gold formulations (CGF 1-7) prepared from CR 1-7 are listed in Table 6.

Prior to formulating, all polyester polyols were diluted in A150 ND to 50 wt. % solids. The solvent blends were made from the mixture of xylene, butanol and MAK at 30%, 30% and 40% by weight, respectively. An empty glass jar with a lid was labeled and pre-weighted to record the tare weight. For each formulation, Curaphen 40-856-B60, Desmodur® BL 2078/2, Nacure® XC-296B and the solvent blend were weighed out respectively and added to the resin solution in order. The formulation was then sheared for 10-15 minutes at 1500 RPMs with a Cowles blade on a Dispermat™ high speed disperser. Once it was completed, the glass jar containing the formulation was then rolled overnight with slight agitation at ambient conditions.

A food grade approved Desmodur® BL 2078/2 available from Covestro AG, and Curaphen 40-856-B60 available from Bitrez were chosen as blocked IPDI trimer and m-cresol phenolic-formaldehyde resin crosslinkers, respectively. A food grade approved Nacure® XC-296B available from King Industrials was chosen as $H_3PO_4$ catalyst.

TABLE 5

Gold Coating Formulations Based on Resins 1-5

| Component | Solids/ Active % | GF-1 Weight (g) | GF-2 Weight (g) | GF-3 Weight (g) | GF-4 Weight (g) | GF-5 Weight (g) |
|---|---|---|---|---|---|---|
| Resin 1 | 50% | 33.78 | | | | |
| Resin 2 | 50% | | 33.78 | | | |
| Resin 3 | 50% | | | 33.78 | | |
| Resin 4 | 50% | | | | 33.78 | |
| Resin 5 | 50% | | | | | 33.78 |
| Curaphen 40-856-B60 | 60% | 7.51 | 7.51 | 7.51 | 7.51 | 7.51 |
| Desmodur ® BL 2078/2 | 60% | 1.88 | 1.88 | 1.88 | 1.88 | 1.88 |
| Nacure ® XC-296B | 28% | 0.12 | 0.12 | 0.12 | 0.12 | 0.12 |
| Solvent Blend (Xylene, Butanol, MAK 30/30/40) | 0% | 6.73 | 6.73 | 6.73 | 6.73 | 6.73 |
| Total | | 50.00 | 50.00 | 50.00 | 50.00 | 50.00 |
| Calculation: | | | | | | |
| % Total solids | | 45.1% | 45.1% | 45.1% | 45.1% | 45.1% |
| % Polyester polyol on total binder | | 75.00% | 75.00% | 75.00% | 75.00% | 75.00% |
| % IPDI on total binder | | 5.00% | 5.00% | 5.00% | 5.00% | 5.00% |
| % Phenolic on total binder | | 20.00% | 20.00% | 20.00% | 20.00% | 20.00% |
| % $H_3PO_4$ catalyst on total solids | | 0.51% | 0.51% | 0.51% | 0.51% | 0.51% |

TABLE 6

| Comparative Gold Coating Formulations Based on CR 1-7 | | | | | | | | |
|---|---|---|---|---|---|---|---|---|
| Component | Solids/ Active % | CGF-1 Weight (g) | CGF-2 Weight (g) | CGF-3 Weight (g) | CGF-4 Weight (g) | CGF-5 Weight (g) | CGF-6 Weight (g) | CGF-7 Weight (g) |
| CR-1 | 50% | 33.78 | | | | | | |
| CR-2 | 50% | | 33.78 | | | | | |
| CR-3 | 50% | | | 33.78 | | | | |
| CR-4 | 50% | | | | 33.78 | | | |
| CR-5 | 50% | | | | | 33.78 | | |
| CR-6 | 50% | | | | | | 33.78 | |
| CR-7 | | | | | | | | 33.78 |
| Curaphen 40-856-B60 | 60% | 7.51 | 7.51 | 7.51 | 7.51 | 7.51 | 7.51 | 7.51 |
| Desmodur ® BL 2078/2 | 60% | 1.88 | 1.88 | 1.88 | 1.88 | 1.88 | 1.88 | 1.88 |
| Nacure ® XC-296B | 28% | 0.12 | 0.12 | 0.12 | 0.12 | 0.12 | 0.12 | 0.12 |
| Solvent Blend (Xylene, Butanol, MAK 30/30/40) | 0% | 6.73 | 6.73 | 6.73 | 6.73 | 6.73 | 6.73 | 6.73 |
| Total | | 50.00 | 50.00 | 50.00 | 50.00 | 50.00 | 50.00 | 5.00 |
| Calculation: | | | | | | | | |
| % Total solids | | 45.1% | 45.1% | 45.1% | 45.1% | 45.1% | 45.1% | 45.1% |
| % Polyester polyol on total binder | | 75.00% | 75.00% | 75.00% | 75.00% | 75.00% | 75.00% | 75.00% |
| % IPDI on total binder | | 5.00% | 5.00% | 5.00% | 5.00% | 5.00% | 5.00% | 5.00% |
| % Phenolic on total binder | | 20.00% | 20.00% | 20.00% | 20.00% | 20.00% | 20.00% | 20.00% |
| % $H_3PO_4$ catalyst on total solids | | 0.51% | 0.51% | 0.51% | 0.51% | 0.51% | 0.51% | 0.51% |

Example 4: Coating Properties of Gold Formulations (GF1-3 and CGF1-7)

The formulations prepared from Example 3 were applied on tin panels available from Lakeside Metals Inc.—0.23 mm thickness, 2.2 g/m$^2$ tin content, temper and annealing type T61CA (described as Lakeside substrate) by casting wet films with wire wound rods—RDS 10 (available from R.D. Specialties, Inc.). This yielded a final dry film weight to achieve approximately 6-8 grams/m$^2$. The cast panels were placed in a rack and held vertically in an oven for cure. A Despatch forced air oven was preheated to a setting temperature of 203° C. The coated panels in the rack were then placed into the oven for 18 minutes of bake cycle time in order to allow the coatings to be baked at 200° C. Peak Metal Temperature (PMT) for 10 minutes. In conclusion of baking cycle, the panel rack was removed from oven and allowed to cool to ambient conditions. A Sencon SI9600 coating thickness gauge was used to confirm the dry film weight of the applied coating. Once the coatings were made, coating performance tests including MEK Double Rubs, Wedge Bend, Micro-cracking, Sterilization Resistance Testing, and 5% Acetic Acid Vapor Test were performed on them. The testing results are listed in Table 7.

TABLE 7

| Coating Properties of Gold Formulations on Lakeside Substrate | | | | | |
|---|---|---|---|---|---|
| Examples | MEK Double Rubs | Pass % of wedge bend | Micro-cracking rating | Total Retort % | 5% Acetic acid vapor test |
| GF1 | 100+ | 79% | 3.5 | 94% | 80% |
| GF2 | 100+ | 86% | 4.5 | 88% | 70% |
| GF3 | 99 | 90% | 3.75 | 83% | NA |
| CGF1 | 63 | 73% | 1.5 | 69% | 0% |
| CGF2 | 100+ | 75% | 1.0 | 50% | 53% |
| CGF3 | 46 | 45% | 1.0 | 59% | 28% |
| CGF4 | 92 | 68% | 1.0 | 80% | 25% |
| CGF5 | 98 | 76% | 0.5 | 83% | 70% |
| CGF6 | 100+ | 80% | 3.0 | 74% | 37% |
| CGF7 | 99 | 80% | 1.0 | 98% | 80% |

Separately, Formulations GF-2, GF-4, GF-5 and CGF-6 were applied on tin panels available from Reynolds Metals Company—0.19 mm thickness, 2.2 g/m$^2$ tin content, temper and annealing type DR-8CA (described as Reynolds substrate) by casting wet films with wire wound rods—RDS 10 (available from R.D. Specialties, Inc.). This yielded a final dry film weight to achieve approximately 6-8 grams/m$^2$. The cast panels were placed in a rack and held vertically in an oven for cure. A Despatch forced air oven was preheated to a setting temperature of 203° C. The coated panels in the rack were then placed into the oven for 18 minutes of bake cycle time in order to allow the coatings to be baked at 200° C. Peak Metal Temperature (PMT) for 10 minutes. In conclusion of baking cycle, the panel rack was removed from oven and allowed to cool to ambient conditions. A Sencon SI9600 coating thickness gauge was used to confirm the dry film weight of the applied coating. Once the coatings were made, coating performance tests including MEK Double Rubs, Wedge Bend, Micro-cracking, Sterilization Resistance Testing, and 5% Acetic Acid Vapor Test were performed on them. The testing results are listed in Table 8.

TABLE 8

Coating Properties of Gold Formulations on Reynolds Substrate

| Examples | MEK double Rubs | Pass % of wedge bend | Micro-cracking rating | Total Retort % | 5% Acetic acid vapor test |
|---|---|---|---|---|---|
| GF2 | 100 | 80% | 4.0 | 95% | 70% |
| GF4 | 100 | 95% | 3.5 | 96% | — |
| GF5 | 98 | 93% | 4.0 | 95% | — |
| CGF6 | 99 | 66% | 2.5 | 87% | 70% |

Example 5: Preparation of White Coating Formulations Containing Amino Crosslinker (WF1-3 and CWF1-7)

Coating formulations intended for white color were prepared by using Resins 1-3 and Comparative Resins, CR-2 and CR-6. The white formulations, WF-1 to WF-3, prepared from Resins 1-3 and the comparative white formulations, CWF-1 and CWF-2, prepared from CR-2 and CR-6 respectively are listed in Table 9.

Prior to formulating, all polyester polyols were first diluted in A150 ND to 50 wt. % solids. The solvent blending was made from the mixture of xylene, butanol and MAK at 30%, 30% and 40% by weight, respectively. An empty glass jar with a lid was labeled and pre-weighted to record the tare weight. To prepare the pigment paste, a sample of the polyester polyol solution (50 weight %, 27.12 g) was added to the pre-weighed glass jar. Ti-Pure™ R900 was then gradually added into the polyester resin solution with a shear rate of 800-1000 RPMs with a Cowles blade on a Dispermat™ high speed disperser. Once all the pigment was added, the shear rate was then increased to 3000 RPMs for 15 minutes. The remaining ingredients including remaining Polyester Polyol (27.12 g), Maprenal® 987, BYK®-1790 (or BYK®-392), Nacure® 5076 and the solvent blend were added into the formulation while stirring with a lab mixer until all ingredients are well mixed. Once it was completed, the glass jar containing the formulation was then rolled overnight with slight agitation at ambient conditions.

A food grade approved Maprenal® BF 987 available commercially from Ineos was chosen as benzoguanamine-formaldehyde resin crosslinker. A food grade approved Nacure® 5076 available commercially from King Industrials was chosen as DDBSA catalyst. A food grade approved Ti-Pure™ R900 available commercially from Chemours was chosen as $TiO_2$ pigment. BYK®-392 and BYK®-1790 commercially available from BYK were chosen as surface additives.

TABLE 9

White Coating Formulations Containing Amino Crosslinker

| Component | Solids/ Active wt. % | WF 1 Weight (g) | WF 2 Weight (g) | WF 3 Weight (g) | CWF-1 Weight (g) | CWF-2 Weight (g) |
|---|---|---|---|---|---|---|
| Resin 1 | 50% | 54.24 | | | | |
| Resin 2 | 50% | | 54.24 | | | |
| Resin 3 | 50% | | | 54.24 | | |
| CR-2 | 50% | | | | 54.24 | |
| CR-6 | 50% | | | | | 54.24 |
| Ti-Pure ™ R 900 TiO2 | 100% | 26.10 | 26.10 | 26.10 | 26.10 | 26.10 |
| Maprenal ® BF 987 | 74% | 6.47 | 6.47 | 6.47 | 6.47 | 6.47 |
| BYK ® - 392 | 100% | | | | 0.50 | |
| BYK ® - 1790 | 100% | 0.26 | 0.26 | 0.26 | | 0.26 |
| Nacure ® 5076 | 70% | 0.19 | 0.19 | 0.19 | 0.19 | 0.19 |
| Solvent Blend (Xylene, Butanol, MAK 30/30/40) | 0% | 12.74 | 12.74 | 12.74 | 12.74 | 12.74 |
| Total | | 100.00 | 100.00 | 100.00 | 100.23 | 100.00 |
| Calculation: | | | | | | |
| % Total solid binder | | 31.90% | 31.90% | 31.90% | 31.90% | 31.90% |
| % Pigment | | 26.10% | 26.10% | 26.10% | 26.10% | 26.10% |
| % Total solids | | 58.30% | 58.30% | 58.30% | 58.60% | 58.30% |
| % Polyester polyol on total binder | | 85.00% | 85.00% | 85.00% | 85.00% | 85.00% |
| % Benzoguanamine on total binder | | 15.00% | 15.00% | 15.00% | 15.00% | 15.00% |
| % DDBSA catalyst on total binder | | 0.42% | 0.42% | 0.42% | 0.42% | 0.42% |

Example 6: Coating Properties of White Formulations (WF1-3 and CWF1-2)

The formulations prepared from Example 5 were applied on tin panels available from Reynolds Metals Company by casting wet films with wire wound rods—RDS 14 (available from R.D. Specialties, Inc.). This yielded a final dry film weight) to achieve approximately 14-16 grams/$m^2$ for pigmented coatings. The cast panels were placed in a rack and held vertically in an oven for cure. A Despatch forced air oven was preheated to a setting temperature of 203° C. The coated panels in the rack were then placed into the oven for 18 minutes of bake cycle time in order to allow the coatings to be baked at 200° C. Peak Metal Temperature (PMT) for 10 minutes. In conclusion of baking cycle, the panel rack was removed from oven and allowed to cool back to ambient conditions. A Sencon SI9600 coating thickness gauge was used to confirm the dry film weight of the applied coating. Once the coatings were made, coating performance tests including MEK Double Rubs, Wedge Bend, Sterilization Resistance Testing, and 5% Acetic Acid Vapor Test were performed on them. The testing results are listed in Table 10.

TABLE 10

Coating Properties of White Formulations (WF 1-3 and CWF 1-2) on Reynolds Substrate

| Examples | MEK double Rubs | Pass % of wedge bend | Total Retort % | 5% Acetic acid vapor test |
|---|---|---|---|---|
| WF1 | 100 | 68% | 90% | 40% |
| WF2 | 100 | 77% | 83% | 55% |
| WF3 | 100 | 76% | 70% | 70% |
| CWF1 | 100 | 81% | 67% | 25% |
| CWF2 | 100 | 71% | 68% | 30% |

Example 7: Preparation of White Coating Formulations Containing Amino and Isocyanate Crosslinkers (WF 4-5 and CWF 3)

Coating formulations intended for white color were prepared by using Resins 1 and 2 and Comparative Resin, CR-6. The white formulations, WF-4 to WF-5, prepared from Resins 1-2 and the comparative white formulation, CWF-3, prepared from CR-6 are listed in Table 11.

Prior to formulating, all polyester polyols were first diluted in A150 ND to 50 wt. % solids. The solvent blending was made from the mixture of xylene, butanol and MAK at 30%, 30% and 40% by weight, respectively. An empty glass jar with a lid was labeled and pre-weighted to record the tare weight. To prepare the pigment paste, a sample of the polyester polyol solution (27.12 g, 50 weight %) was added to the pre-weighed glass jar. Ti-Pure™ R900 was then gradually added into the polyester resin solution with a shear rate of 800-1000 RPMs with a Cowles blade on a Dispermat™ high speed disperser. Once all the pigment was added, the shear rate then increased to 3000 RPMs for 15 minutes. The remaining ingredients including remaining Polyester Polyol (27.12 g), Maprenal® 987, Desmodur® BL 2078/2, BYK®-1790 (or BYK®-392), Nacure® 5076 and the solvent blend were added into the formulation while stirring with a lab mixer until all ingredients are well mixed. Once it was completed, the glass jar containing the formulation was then rolled overnight with slight agitation at ambient conditions.

Food grade approved Maprenal® BF 987 and Desmodur® BL 2078/2 available commercially from Ineos and Covestro were chosen as benzoguanamine-formaldehyde resin crosslinker and blocked IPDI trimer crosslinker, respectively. A food grade approved Nacure® 5076 available commercially from King Industrials was chosen as DDBSA catalyst. A food grade approved Ti-Pure™ R900 available commercially from Chemours was chosen as TiO2 pigment. BYK®-392 and BYK®-1790 commercially available from BYK were chosen as surface additives.

TABLE 11

White Coating Formulations Containing Amino and Isocyanate Crosslinkers

| Component | Solids/ Active wt. % | WF 4 Weight (g) | WF 5 Weight (g) | CWF 3 Weight (g) |
|---|---|---|---|---|
| Resin 1 | 50% | 54.24 | | |
| Resin 2 | 50% | | 54.24 | |
| CR-6 | 50% | | | 54.24 |
| Ti-Pure ™ R 900 TiO2 | 100% | 26.10 | 26.10 | 26.10 |
| Maprenal ® 987 | 74% | 6.47 | 6.47 | 6.47 |
| Desmodur ® BL 2078/2 | 60% | 5.00 | 5.00 | 5.00 |
| BYK ® - 1790 | 100% | 0.26 | 0.26 | 0.26 |
| Nacure ® 5076 | 70% | 0.19 | 0.19 | 0.19 |
| Solvent Blend (Xylene, Butanol, MAK 30/30/40) | 0% | 12.75 | 12.75 | 12.75 |
| Total | | 105.01 | 105.01 | 105.01 |
| Calculation: | | | | |
| % Total solid binder | | 33.24% | 33.24% | 33.24% |
| % Pigment | | 24.86% | 24.86% | 24.86% |
| % Total solids | | 58.50% | 58.50% | 58.50% |
| % Polyester polyol on total binder | | 77.7% | 77.7% | 77.7% |
| % Benzoguanamine on total binder | | 13.71% | 13.71% | 13.71% |
| % IPDI on total binder | | 8.59% | 8.59% | 8.59% |
| % DDBSA catalyst on total binder | | 0.38% | 0.38% | 0.38% |

Example 8: Coating Properties of White Formulations (WF4-5 and CWF3)

The formulations prepared from Example 7 were applied on tin panels available from Reynolds Metals Company by casting wet films with wire wound rods—RDS 14 (available from R.D. Specialties, Inc.). This yielded a final dry film weight to achieve approximately 14-16 grams/$m_2$ for pigmented coatings. The cast panels were placed in a rack and held vertically in an oven for cure. A Despatch forced air oven was preheated to a setting temperature of 203° C. The coated panels in the rack were then placed into the oven for 18 minutes of bake cycle time in order to allow the coatings to be baked at 200° C. Peak Metal Temperature (PMT) for 10 minutes. In conclusion of baking cycle, the panel rack was removed from oven and allowed to cool to ambient conditions. A Sencon SI9600 coating thickness gauge was used to confirm the dry film weight of the applied coating. Once the coatings were made, coating performance tests including MEK Double Rubs, Wedge Bend, Sterilization Resistance Testing, and 5% Acetic Acid Vapor Test were performed on them. The testing results are listed in Table 12.

TABLE 12

Coating Properties of White Formulations (WF 4-5 and CWF 3) on Reynolds Substrate

| Examples | MEK double Rubs | Pass % of wedge bend | Total Retort % | 5% Acetic acid vapor test |
|---|---|---|---|---|
| WF4 | 100+ | 79% | 94% | 62% |
| WF5 | 100+ | 80% | 90% | 63% |
| CWF3 | 100+ | 73% | 71% | 53% |

As demonstrated above, this invention provides a non-BPA coating composition having improved coating properties for metal packaging application, which comprises:

a. a polyester polyol, which is the reaction product of the monomers comprising:
 i. 2,2,4,4-Tetramethyl-1,3-cyclobutanediol (TMCD) in an amount of 28 to 60 mole %, based on the total moles of i-iv,
 ii. 2-methyl-1,3-propanediol (MPdiol) in an amount of 5 to 45 mole %, based on the total moles of i-iv,
 iii. Cyclohexanedimethanol (CHDM) in an amount of 10 to 45 mole %, based on the total moles of i-iv,
 iv. trimethylolpropane (TMP) in an amount of 1 to 4.5 mole %, based on the total moles of i-iv,
 v. terephthalic acid (TPA) in an amount of 45-100 mole %, based on the total moles of v-vii,
 vi. isophthalic acid (IPA) in an amount of 0-55 mole %, based on the total moles of v-vii, and
 vii. an acyclic aliphatic diacid in an amount of 0-15 mole %, based on the total moles of v-vii, and b. one or more crosslinkers selected from the group consisting of resole phenolic resin, isocyanate, and amino resin crosslinkers, wherein said polyester polyol has a glass transition temperature (Tg) of 50 to 110° C., acid number of 0 to 10 mgKOH/g, hydroxyl number of 10 to 40 mgKOH/g, number average molecular weight of 5,000 to 20,000 mgKOH/g, and weight average molecular weight of 10,000 to 100,000; and wherein said coating has a solvent resistance of greater than 50 MEK double rubs as measured by ASTM D7835 and a wedge bend resistance (% pass) of 70-100 as measured by ASTM D3281. The coating has particular utility as a non-BPA containing coating for use in interior can coatings.

The invention has been described in detail with reference to the embodiments disclosed herein, but it will be understood that variations and modifications can be effected within the spirit and scope of the invention.

We claim:

1. A coating composition for metal packaging, comprising:

a. a polyester polyol, which is the reaction product of the monomers comprising:
 i. 2,2,4,4-tetramethyl-1,3-cyclobutanediol in an amount of 28 to 60 mole %, based on the total moles of i-iv,
 ii. 2-methyl-1,3-propanediol in an amount of 5 to 45 mole %, based on the total moles of i-iv,
 iii. cyclohexanedimethanol in an amount of 10 to 45 mole %, based on the total moles of i-iv,
 iv. trimethylolpropane in an amount of 0.6 to 4.5 mole %, based on the total moles of i-iv,
 v. terephthalic acid in an amount of 45-100 mole %, based on the total moles of v-vii,
 vi. isophthalic acid in an amount of 0-55 mole %, based on the total moles of v-vii, and
 vii. an acyclic aliphatic diacid in an amount of 0-15 mole %, based on the total moles of v-vii, and b. at least one crosslinker selected from the group consisting of resole phenolic resin, isocyanate, and amino resin crosslinkers, wherein said polyester polyol has a glass transition temperature (Tg) of 50 to 110° C., acid number of 0 to 10 mgKOH/g, hydroxyl number of 10 to 40 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 70-100 as measured by ASTM D3281.

2. The coating composition of claim 1, wherein 2,2,4,4-tetramethyl-1,3-cyclobutanediol (i) is in an amount of 45-55 mole %, 2-methyl-1,3-propanediol (ii) 8-15 mole %, cyclohexanedimethanol (iii) 30-40 mole %, trimethylolpropane (iv) 2-4 mole %, terephthalic acid (v) 50-80 mole %, isophthalic acid (vi) 16-46 mole %, and acyclic aliphatic diacid (vii) 4-8 mole %.

3. The coating composition of claim 1, wherein 2,2,4,4-tetramethyl-1,3-cyclobutanediol (i) is in an amount of 28-60 mole %, 2-methyl-1,3-propanediol (ii) 25-50 mole %, cyclohexanedimethanol (iii) 10-40 mole %, trimethylolpropane (iv) 1-4 mole %, terephthalic acid (v) 60-100 mole %, isophthalic acid (vi) 0-40 mole %, and acyclic aliphatic diacid (vii) 0-15 mole %.

4. The coating composition of claim 1, wherein said cyclohexanedimethanol (iii) is selected from 1,4-cyclohexanedimethanol, 1,3-cyclohexane-dimethanol, and a mixture thereof.

5. The coating composition of claim 1, wherein said acyclic aliphatic diacid (vii) is one or more selected from succinic acid, adipic acid, sebacic acid, dodecanedioic acid, and dimer acid.

6. The coating composition of claim 1, wherein said polyester polyol (a) has a hydroxyl number of 12-30 mgKOH/g and wherein said polyester polyol (a) has a Tg of 70-95° C.

7. The coating composition of claim 1, wherein the crosslinker (b) is resole phenolic resin, or isocyanate, or a mixture thereof.

8. The coating composition of claim 1, wherein said resole phenolic resin is in an amount of 70-90 weight % and said isocyanate in an amount of 10-30 weight %, based on the total weight of the crosslinkers.

9. The coating composition of claim 1 wherein said resole phenolic resin comprises residues of m-substituted phenol.

10. The coating composition of claim 1 wherein said isocyanate is isophorone diisocyanate.

11. The coating composition of claim 1, wherein said polyester polyol (a) in an amount of 50-90 weight % and said crosslinker (b) in an amount of 10-50 weight %, based on the total weight of (a) and (b).

12. The coating composition of claim 1, further comprising one or more organic solvents selected from the group comprising xylene, methyl amyl ketone, 2-butoxyethanol, ethyl-3-ethoxypropionate, toluene, butanol, cyclopentanone, cyclohexanone, ethyl acetate, and butyl acetate.

13. The coating composition of claim 1, wherein said coating has a solvent resistance of greater than 90 MEK double rubs as measured by ASTM D7835, and a wedge bend resistance (% pass) of 80-100 as measured by ASTM D3281.

14. The coating composition of claim 1, wherein:
a. the polyester polyol is present in an amount of 70-80 weight % based on the total weight of (a), (b), and (c), which is the reaction product of the monomers comprising:
i. 2,2,4,4-tetramethyl-1,3-cyclobutanediol in an amount of 28 to 60 mole %, based on the total moles of i-iv,
ii. 2-methyl-1,3-propanediol in an amount of 5 to 45 mole %, based on the total moles of i-iv,
iii. cyclohexanedimethanol in an amount of 10 to 45 mole %, based on the total moles of i-iv,
iv. trimethylolpropane in an amount of 1 to 4.5 mole %, based on the total moles of i-iv,
v. terephthalic acid in an amount of 45-100 mole %, based on the total moles of v-vii,
vi. isophthalic acid in an amount of 0-55 mole %, based on the total moles of v-vii, and
vii. an acyclic aliphatic diacid in an amount of 0-15 mole %, based on the total moles of v-vii,
b. a resole phenolic resin in an amount of 12-27 weight % based on the total weight of (a), (b), and (c), and
c. isophorone diisocyanate in an amount of 3-8 weight % based on the total weight of (a), (b), and (c),
wherein said polyester polyol has a glass transition temperature (Tg) of 50 to 110° C.; an acid number of 0 to 10 mgKOH/g; a hydroxyl number of 10 to 30 mgKOH/g; a number average molecular weight of 5,000 to 20,000 mgKOH/g; and a weight average molecular weight of 10,000 to 100,000; and
wherein said coating has a solvent resistance of greater than 80 MEK double rubs as measured by ASTM D7835; and a wedge bend resistance (% pass) of 70-100 as measured by the method of ASTM D3281.

15. The coating composition of claim 1, wherein:
a. the polyester polyol is present in an amount of 80-90 weight % based on the total weight of (a) and (b), which is the reaction product of the monomers comprising:
i. 2,2,4,4-tetramethyl-1,3-cyclobutanediol in an amount of 28 to 60 mole %, based on the total moles of i-iv,
ii. 2-methyl-1,3-propanediol in an amount of 5 to 45 mole %, based on the total moles of i-iv,
iii. cyclohexanedimethanol in an amount of 10 to 45 mole %, based on the total moles of i-iv,
iv. trimethylolpropane in an amount of 1 to 4.5 mole %, based on the total moles of i-iv,
v. terephthalic acid in an amount of 45-100 mole %, based on the total moles of v-vii,
vi. isophthalic acid in an amount of 0-55 mole %, based on the total moles of v-vii, and
vii. an acyclic aliphatic diacid in an amount of 0-15 mole %, based on the total moles of v-vii, and
b. the crosslinker (b) is a benzoguanamine formaldehyde resin in an amount of 10-20 weight % based on the total weight of (a) and (b), and
wherein said coating composition further comprises a titanium dioxide pigment, and
wherein said polyester polyol has a glass transition temperature (Tg) of 50 to 110° C.; an acid number of 0 to 10 mgKOH/g; a hydroxyl number of 10 to 30 mgKOH/g; a number average molecular weight of 5,000 to 20,000 mgKOH/g; and a weight average molecular weight of 10,000 to 100,000; and
wherein said coating has a solvent resistance of greater than 80 MEK double rubs as measured by ASTM D7835; and a wedge bend resistance (% pass) of 65-100 as measured by the method of ASTM D3281.

16. The coating composition of claim 1, wherein:
a. the polyester polyol is present in an amount of 70-85 weight % based on the total weight of (a), (b), and (c), which is the reaction product of the monomers comprising:
i. 2,2,4,4-tetramethyl-1,3-cyclobutanediol in an amount of 28 to 60 mole %, based on the total moles of i-iv,
ii. 2-methyl-1,3-propanediol in an amount of 5 to 45 mole %, based on the total moles of i-iv,
iii. cyclohexanedimethanol in an amount of 10 to 45 mole %, based on the total moles of i-iv,
iv. trimethylolpropane in an amount of 1 to 4.5 mole %, based on the total moles of i-iv,
v. terephthalic acid in an amount of 45-100 mole %, based on the total moles of v-vii,
vi. isophthalic acid in an amount of 0-55 mole %, based on the total moles of v-vii, and
vii. an acyclic aliphatic diacid in an amount of 0-15 mole %, based on the total moles of v-vii,
b. a benzoguanamine formaldehyde resin in an amount of 10-20 weight % based on the total weight of (a), (b), and (c), and
c. isophorone diisocyanate in an amount of 5-12 weight % based on the total weight of (a), (b), and (c),
wherein said coating composition further comprises a titanium dioxide pigment; and
wherein said polyester polyol has a glass transition temperature (Tg) of 50 to 110° C.; an acid number of 0 to 10 mgKOH/g; a hydroxyl number of 10 to 30 mgKOH/g; a number average molecular weight of 5,000 to 20,000 mgKOH/g; and a weight average molecular weight of 10,000 to 100,000; and
wherein said coating has a solvent resistance of greater than 80 MEK double rubs as measured by ASTM D7835 and a wedge bend resistance (% pass) of 75-100 as measured by the method of ASTM D3281.

17. A coating composition comprising:
a. a polyester polyol in an amount of 70-90 weight % based on the total weight of (a) and (b), which is the reaction product of the monomers comprising:
i. 2,2,4,4-Tetramethyl-1,3-cyclobutanediol (TMCD) in an amount of 28 to 60 mole %, based on the total moles of i-iv,
ii. 2-methyl-1,3-propanediol (MPdiol) in an amount of 5 to 45 mole %, based on the total moles of i-iv,
iii. neopentyl glycol (NPG) in an amount of 10 to 45 mole %, based on the total moles of i-iv,
iv. trimethylolpropane (TMP) in an amount of 1 to 4.5 mole %, based on the total moles of i-iv,
v. terephthalic acid (TPA) in an amount of 80-100 mole %, based on the total moles of v-vii,
vi. isophthalic acid (IPA) in an amount of 0-20 mole %, based on the total moles of v-vii, and
vii. an acyclic aliphatic diacid in an amount of 0-15 mole %, based on the total moles of v-vii, and
b. a benzoguanamine formaldehyde resin in an amount of 10-20 weight % based on the total weight of (a) and (b),
wherein said coating composition further comprises a titanium dioxide pigment, and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured ASTM D7835 and a wedge bend resistance (% pass) of 65-100 as measured by ASTM D3281.

18. The coating composition of claim 17, wherein:

a. the polyester polyol is present in an amount of 70-85 weight % based on the total weight of (a), (b), and (c), which is the reaction product of the monomers comprising:

i. 2,2,4,4-Tetramethyl-1,3-cyclobutanediol (TMCD) in an amount of 28 to 60 mole %, based on the total moles of i-iv, ii. 2-methyl-1,3-propanediol (MPdiol) in an amount of 5 to 45 mole %, based on the total moles of i-iv, iii. neopentyl glycol (NPG) in an amount of 10 to 45 mole %, based on the total moles of i-iv, iv. trimethylolpropane (TMP) in an amount of 1 to 4.5 mole %, based on the total moles of i-iv, v. terephthalic acid (TPA) in an amount of 80-100 mole %, based on the total moles of v-vii, vi. isophthalic acid (IPA) in an amount of 0-20 mole %, based on the total moles of v-vii, and vii. an acyclic aliphatic diacid in an amount of 0-15 mole %, based on the total moles of v-vii, b. a benzoguanamine formaldehyde resin in an amount of 10-20 weight % based on the total weight of (a), (b), and (c), and c. isophorone diisocyanate (IPDI) in an amount of 5-12 weight % based on the total weight of (a), (b), and (c), wherein said coating composition further comprises a titanium dioxide pigment, and wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 75-100 as measured by ASTM D3281.

19. The coating composition of claim 17, wherein:

a. a polyester polyol in an amount of 70-80 weight % based on the total weight of (a), (b), and (c), which is the reaction product of the monomers comprising:

i. 2,2,4,4-Tetramethyl-1,3-cyclobutanediol (TMCD) in an amount of 28 to 60 mole %, based on the total moles of i-iv, ii. 2-methyl-1,3-propanediol (MPdiol) in an amount of 5 to 45 mole %, based on the total moles of i-iv, iii. neopentyl glycol (NPG) in an amount of 10 to 45 mole %, based on the total moles of i-iv, iv. trimethylolpropane (TMP) in an amount of 1 to 4.5 mole %, based on the total moles of i-iv, v. terephthalic acid (TPA) in an amount of 80-100 mole %, based on the total moles of v-vii, vi. isophthalic acid (IPA) in an amount of 0-20 mole %, based on the total moles of v-vii, and vii. an acyclic aliphatic diacid in an amount of 0-15 mole %, based on the total moles of v-vii, b. a resole phenolic resin in an amount of 12-27 weight % based on the total weight of (a), (b), and (c), and c. isophorone diisocyanate (IPDI) in an amount of 3-8 weight % based on the total weight of (a), (b), and (c), wherein said polyester polyol has a glass transition temperature (Tg) of 50 to 110° C., acid number of 0 to 10 mgKOH/g, hydroxyl number of 10 to 30 mgKOH/g, number average molecular weight of 5,000 to 20,000 mgKOH/g, and weight average molecular weight of 10,000 to 100,000; and wherein said coating has a solvent resistance of greater than 80 MEK double rubs as measured by ASTM D7835 and a wedge bend resistance (% pass) of 70-100 as measured by the method of ASTM D3281.

* * * * *